United States Patent
Amiruddin et al.

(10) Patent No.: US 8,765,306 B2
(45) Date of Patent: Jul. 1, 2014

(54) HIGH VOLTAGE BATTERY FORMATION PROTOCOLS AND CONTROL OF CHARGING AND DISCHARGING FOR DESIRABLE LONG TERM CYCLING PERFORMANCE

(75) Inventors: Shabab Amiruddin, Fremont, CA (US); Subramanian Venkatachalam, Pleasanton, CA (US); Herman A. Lopez, Sunnyvale, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 312 days.

(21) Appl. No.: 12/732,520

(22) Filed: Mar. 26, 2010

(65) Prior Publication Data

US 2011/0236751 A1    Sep. 29, 2011

(51) Int. Cl.

| | |
|---|---|
| *H01M 10/0525* | (2010.01) |
| *H01M 4/525* | (2010.01) |
| *H01M 4/583* | (2010.01) |
| *H01M 10/44* | (2006.01) |
| *H02J 7/00* | (2006.01) |
| *H01M 4/505* | (2010.01) |
| *H01M 4/587* | (2010.01) |
| *H01M 4/04* | (2006.01) |
| *H01M 4/131* | (2010.01) |
| *H01M 10/058* | (2010.01) |
| *H01M 10/0585* | (2010.01) |

(52) U.S. Cl.
CPC ............. *H02J 7/0075* (2013.01); *H01M 4/505* (2013.01); *H01M 4/0447* (2013.01); *Y02E 60/122* (2013.01); *H01M 10/44* (2013.01); *H01M 10/0525* (2013.01); *H01M 4/587* (2013.01); *H01M 10/446* (2013.01)
USPC ... 429/231.95; 429/223; 429/224; 429/231.1; 429/231.3; 320/137; 320/160

(58) Field of Classification Search
USPC ............ 429/188, 231.8, 223, 224, 231.1, 231, 429/3, 231.95; 29/623.1; 320/137, 160
See application file for complete search history.

(56) References Cited

U.S. PATENT DOCUMENTS

| | | | |
|---|---|---|---|
| 5,493,197 | A | 2/1996 | Eguchi et al. |
| 5,514,488 | A | 5/1996 | Hake et al. |

(Continued)

FOREIGN PATENT DOCUMENTS

| | | |
|---|---|---|
| JP | 07-065825 | 3/1995 |
| JP | 09-045373 | 2/1997 |

(Continued)

OTHER PUBLICATIONS

IPDL Machine Translation of JP 2002270158A—Sep. 2002.*

(Continued)

*Primary Examiner* — Gregg Cantelmo
(74) *Attorney, Agent, or Firm* — Dardi & Herbert, PLLC; Peter S. Dardi

(57) ABSTRACT

Improved cycling of high voltage lithium ion batteries is accomplished through the use of a formation step that seems to form a more stable structure for subsequent cycling and through the improved management of the charge-discharge cycling. In particular, the formation charge for the battery can be performed at a lower voltage prior to full activation of the battery through a charge to the specified operational voltage of the battery. With respect to management of the charging and discharging of the battery, it has been discovered that for the lithium rich high voltage compositions of interest that a deeper discharge can preserve the cycling capacity at a greater number of cycles. Battery management can be designed to exploit the improved cycling capacity obtained with deeper discharges of the battery.

15 Claims, 10 Drawing Sheets

(56) References Cited

U.S. PATENT DOCUMENTS

| | | |
|---|---|---|
| 6,053,953 A | 4/2000 | Tomiyama et al. |
| 6,075,346 A | 6/2000 | Kikuchi et al. |
| 6,080,507 A | 6/2000 | Yu |
| 6,087,810 A | 7/2000 | Yoshida |
| 6,140,928 A | 10/2000 | Shibuya et al. |
| 6,171,723 B1 | 1/2001 | Loch et al. |
| 6,235,427 B1 | 5/2001 | Idota et al. |
| 6,251,822 B1 | 6/2001 | Peng et al. |
| 6,262,561 B1 | 7/2001 | Takahashi et al. |
| 6,337,156 B1 | 1/2002 | Narang et al. |
| 6,383,687 B1 | 5/2002 | Gibbons et al. |
| 6,392,385 B1 | 5/2002 | Barker et al. |
| 6,420,071 B1 | 7/2002 | Lee et al. |
| 6,428,933 B1 * | 8/2002 | Christensen et al. .... 429/231.95 |
| 6,468,690 B1 | 10/2002 | Barker et al. |
| 6,475,680 B1 * | 11/2002 | Arai et al. ................. 429/340 |
| 6,511,767 B1 | 1/2003 | Calver et al. |
| 6,528,208 B1 | 3/2003 | Thackeray et al. |
| 6,616,715 B2 | 9/2003 | Kitoh et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,730,429 B2 | 5/2004 | Thackeray et al. |
| 6,749,648 B1 | 6/2004 | Kumar et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,790,243 B2 | 9/2004 | Vaidyanathan |
| 6,855,460 B2 | 2/2005 | Vaughey et al. |
| 6,873,135 B2 | 3/2005 | Nakatsuji |
| 6,884,546 B1 | 4/2005 | Fujita et al. |
| 6,936,382 B2 | 8/2005 | Mikhaylik et al. |
| 6,951,699 B2 | 10/2005 | Yata et al. |
| 6,964,828 B2 | 11/2005 | Lu et al. |
| 7,026,074 B2 | 4/2006 | Chen et al. |
| 7,033,702 B2 | 4/2006 | Dasgupta et al. |
| 7,053,588 B2 | 5/2006 | Nakanishi et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,186,479 B2 | 3/2007 | Krasnov et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,214,446 B1 | 5/2007 | Bi et al. |
| 7,229,717 B2 | 6/2007 | Yamaguchi et al. |
| 7,235,330 B1 | 6/2007 | Fujimoto et al. |
| 7,252,907 B2 | 8/2007 | Takeuchi et al. |
| 7,273,682 B2 | 9/2007 | Park et al. |
| 7,276,881 B2 | 10/2007 | Okumura et al. |
| 7,338,734 B2 | 3/2008 | Chiang et al. |
| 7,351,494 B2 | 4/2008 | Hennige et al. |
| 7,368,071 B2 | 5/2008 | Dahn et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,496,460 B2 | 2/2009 | Hornick et al. |
| 7,497,285 B1 | 3/2009 | Radev |
| 7,507,503 B2 | 3/2009 | Amine et al. |
| 7,510,803 B2 | 3/2009 | Adachi et al. |
| 7,544,443 B2 | 6/2009 | Fujihara et al. |
| 7,554,291 B2 | 6/2009 | Yoshida |
| 7,718,306 B2 | 5/2010 | Cheon et al. |
| 2002/0034678 A1 | 3/2002 | Shibuya et al. |
| 2002/0037458 A1 | 3/2002 | Yamaguchi et al. |
| 2002/0102462 A1 | 8/2002 | Huggins et al. |
| 2002/0122973 A1 | 9/2002 | Manev et al. |
| 2002/0136954 A1 * | 9/2002 | M. Thackeray et al. ... 429/231.1 |
| 2003/0087155 A1 | 5/2003 | Cho et al. |
| 2003/0157014 A1 | 8/2003 | Wang et al. |
| 2004/0072072 A1 | 4/2004 | Suzuki et al. |
| 2004/0151951 A1 | 8/2004 | Hyung et al. |
| 2004/0161669 A1 | 8/2004 | Zolotnik et al. |
| 2004/0191630 A1 | 9/2004 | Kawamura et al. |
| 2005/0019670 A1 | 1/2005 | Amine et al. |
| 2005/0026037 A1 | 2/2005 | Riley, Jr. et al. |
| 2005/0031942 A1 | 2/2005 | Hennige et al. |
| 2005/0079422 A1 | 4/2005 | Ko et al. |
| 2005/0202316 A1 | 9/2005 | Hwang et al. |
| 2005/0233207 A1 | 10/2005 | Kim |
| 2006/0051671 A1 | 3/2006 | Thackeray et al. |
| 2006/0051673 A1 | 3/2006 | Johnson et al. |
| 2006/0099472 A1 | 5/2006 | Hsu |
| 2006/0147809 A1 | 7/2006 | Amine et al. |
| 2006/0159994 A1 | 7/2006 | Dahn et al. |
| 2006/0197496 A1 | 9/2006 | Iijima et al. |
| 2006/0269834 A1 | 11/2006 | West et al. |
| 2006/0286438 A1 | 12/2006 | Fujikawa et al. |
| 2007/0148544 A1 | 6/2007 | Le |
| 2007/0148549 A1 | 6/2007 | Kobayashi et al. |
| 2007/0229034 A1 | 10/2007 | Tatebayashi et al. |
| 2008/0008933 A1 | 1/2008 | Lampe-Onnerud |
| 2008/0026297 A1 | 1/2008 | Chen et al. |
| 2008/0100143 A1 | 5/2008 | Lipcsei |
| 2008/0143300 A1 | 6/2008 | Yoshida |
| 2008/0218127 A1 | 9/2008 | Kao et al. |
| 2008/0218130 A1 | 9/2008 | Guo et al. |
| 2008/0231237 A1 | 9/2008 | Kishi et al. |
| 2008/0233469 A1 | 9/2008 | Drozdz et al. |
| 2008/0261115 A1 | 10/2008 | Saito et al. |
| 2008/0318122 A1 | 12/2008 | Sun |
| 2009/0017364 A1 | 1/2009 | Manev |
| 2009/0058393 A1 | 3/2009 | Huang |
| 2009/0092900 A1 | 4/2009 | Obana et al. |
| 2009/0104510 A1 | 4/2009 | Fulop et al. |
| 2009/0106970 A1 | 4/2009 | Fan et al. |
| 2009/0253042 A1 | 10/2009 | Sun et al. |
| 2009/0263707 A1 | 10/2009 | Buckley et al. |
| 2009/0263721 A1 | 10/2009 | Haruna et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0244331 A1 | 10/2011 | Karthikeyan et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |
| 2012/0105007 A1 | 5/2012 | Amiruddin et al. |
| 2012/0107680 A1 | 5/2012 | Amiruddin et al. |
| 2012/0295155 A1 | 11/2012 | Deng et al. |
| 2013/0157147 A1 | 6/2013 | Li et al. |

FOREIGN PATENT DOCUMENTS

| | | |
|---|---|---|
| JP | 10-255837 | 9/1998 |
| JP | 2000-012018 | 1/2000 |
| JP | 2002-110167 | 4/2002 |
| JP | 2002270158 A * | 9/2002 |
| JP | 2003-223887 A | 8/2003 |
| JP | 2003-242978 A | 8/2003 |
| JP | 2004-234897 A | 8/2004 |
| JP | 2005-251684 A | 9/2005 |
| JP | 2005332707 A * | 12/2005 |
| JP | 2007-066667 A | 3/2007 |
| JP | 2010-103086 | 5/2010 |
| KR | 10-2001-0043360 A | 5/2001 |
| KR | 10-2003-0007651 A | 1/2003 |
| KR | 10-2005-0111764 | 11/2005 |
| KR | 10-0578877 | 5/2006 |
| KR | 10-0684724 | 2/2007 |
| KR | 10-2010-0019933 A | 2/2010 |
| TW | 531924 | 5/2003 |
| TW | I251359 | 3/2006 |
| TW | I263369 | 10/2006 |
| WO | 01/35473 A1 | 5/2001 |

(56) References Cited

FOREIGN PATENT DOCUMENTS

| WO | 01/91209 | A1 | 11/2001 |
|---|---|---|---|
| WO | 02/22390 | A1 | 3/2002 |
| WO | 03/021697 | A2 | 3/2003 |
| WO | 2004/084330 | A2 | 9/2004 |
| WO | 2005-031892 | | 4/2005 |
| WO | 2005/083829 | A2 | 9/2005 |
| WO | 2006/109930 | A1 | 10/2006 |
| WO | 2006/137673 | A1 | 12/2006 |
| WO | 2008/086041 | A1 | 7/2008 |
| WO | 2009/011239 | A1 | 1/2009 |
| WO | 2009/022848 | A1 | 2/2009 |

OTHER PUBLICATIONS

IPDL Machine Translation of JP 2005332707A—Dec. 2005.*

Kang et al., "Enchancing the rate capability of high capacity $xLi_2MnO_3 \cdot (1-x)LiMO_2$ (M=Mn, Ni, Co) electrodes by Li—Ni—PO4 treatment," Electrochemistry Communications 11 (2009) 748-751.

Kang et al., "Layered $Li(Li_{0.2}Ni_{0.15+0.5z}Co_{0.10}Mn_{0.55-0.5z})O_2-zF_z$ cathode materials for Li-ion secondary batteries," Journal of Power Sources 146 (2005) 654-657.

Kim et al., "Synthesis of spherical $Li[Ni_{(1/3-z)}Co_{(1/3-z)}Mn_{(1/3-z)}Mg_z]O_2$ as positive electrode material for lithium ion battery," Electrochimica Acta 51 (2006) 2447-2453.

Kim et al., "Improvement of High-Voltage Cycling Behavior of Surface Modified $Li[Ni_{1/3}Co_{1/3}Mn_{1/3}]O_2$ Cathodes by Fluorine Substitution for Li-Ion Batteries," Journal of the Electrochemical Society 152 (9) A1701-A1713 (2005).

Lee et al., "High capacity $Li[Li_{0.2}Ni_{0.2}Mn_{0.6}]O_2$ cathode materials via a carbonate co-precipitation method," J. of Power Sources, 162 (2006), 1346-1350.

Luo et al., "On the incorporation of fluorine into the manganese spinel cathode lattice," Solid State Ionics 180 (2009) 703-707.

Park et al., "Physical and electrochemical properties of spherical $Li_{1+x}(Ni_{1/3}Co_{1/3}Mn_{1/3})_{1-x}O_2$ cathode materials", Journal of Power Sources, 177:177-183 (2008).

Song et al., Two-and three-electrode impedance spectroscopy of lithium-ion batteries, Journal of Power Sources 111 (2002) 255-267.

Sun et al., "AIF3-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007).

Sun et al, "Significant Improvement of high voltage cycling behavior AIF3-coated $LiCoO_2$ cathode," Electrochemistry Communications 8 (2006) 821-826.

Sun et al, "The preparation and electrochemical performance of solid solutions $LiCoO_2-Li_2MnO_3$ as cathode materials for lithium ion batteries," J of Power Sources 159 (2006) 1353-1359.

Thackeray et al., "$Li_2MnO_3$-stabilized $LiMO_2$ (M=Mn, Ni, Co) electrodes for lithium-ion batteries," J. Mater. Chem., 2007; 17:3112-3125.

Thackeray et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538.

Woo et al., "Significant Improvement of Electrochemical Performance of AIF3-Coated $Li[Ni_{0.8}Co_{0.1}Mn_{0.1}]O_2$ Cathode Materials," J. of the Electrochemical Society, 154 (11) A1005-A1009 (2007).

Wu et al., "High Capacity, Surface-Modified Layered $Li[Li_{(1-x)/3}Mn_{(2-x)/3}Ni_x/3Co_x/3]O_2$ Cathodes with Low Irreversible Capacity Loss," Electrochemical and Solid State Letters, 9 (5) A221-A224 (2006).

"Scientific breakthrough: SEPARION® opens up new markets for lithium ion batteries," http://corporate.evonik.de/en/company/news/lithium__ion__batteries/pp./separion.aspx.

"Battery Test Manual for Plug-In Hybrid Elelctric Vehicles," prepared for the U.S. Department of Energy, Office of Energy Efficiency and Renewable Energy, Vehicle Technologies Program, 2008.

Ito et al., Cyclic deterioration and its improvement for Li-rich layered cathode material Li $[Ni_{0.17}Li_{0.2}Co_{0.07}Mn_{0.56}]O_2$, Journal of Power Sources, 2010; 195:567-573. (Abstract only).

Ito et al., "A new approach to improve the high-volage cyclic performance of Li-rich layered cathode material by electrochemical pretreatment," Journal of Power Sources, 2008; 183:344-346. (Abstract only).

Taiwan Search Report from corresponding Taiwan Patent Application dated Oct. 10, 2013 (1 page).

* cited by examiner

US 8,765,306 B2

HIGH VOLTAGE BATTERY FORMATION PROTOCOLS AND CONTROL OF CHARGING AND DISCHARGING FOR DESIRABLE LONG TERM CYCLING PERFORMANCE

FIELD OF THE INVENTION

The invention relates to lithium ion batteries with cathode active materials that provide for relatively high voltage operation and procedures for preparing the batteries and cycling the batteries such that the batteries exhibit good cycling in high voltage operation. The invention further relates to control circuitry that operates the battery and associated charging functions such that the battery maintains a higher capacity over longer team cycling.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, only a fraction of the theoretical capacity of the cathode can be used, e.g., roughly 140 mAh/g for some commercial batteries. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity. With either type of battery design, it generally is desirable to have a greater accessible capacity as well as a greater average voltage.

SUMMARY OF THE INVENTION

In a first aspect, the invention pertains to a method for first charging a secondary battery comprising a positive electrode comprising a lithium intercalation composition, a negative electrode comprising elemental carbon, a separator between the electrodes and an electrolyte comprising lithium ions. The method comprises performing a first charge of the battery to a voltage no more than about 4.3 volts, after completing the first charge, holding the battery at an open circuit for a time period of at least about 12 hours rest period, and performing a second charge after the completion of the rest period to a voltage of at least about 4.35 volts.

In other aspects, the invention pertains to a lithium ion battery comprising a positive electrode, a negative electrode, and separator between the positive electrode and the negative electrode, and an electrolyte comprising lithium ions. The positive electrode generally comprises a lithium intercalation composition and the negative electrode generally comprises a lithium intercalation/alloy composition. In some embodiments, following an initial charge and discharge cycle, the negative electrode exhibits a phase stability to at least 130° C., as determined with reference to an onset temperature in a differential scanning calorimetry evaluation.

In another aspect, the invention pertains to a battery management system comprising a monitoring circuit, a charge-discharge circuit and a processor. The monitoring circuit is operably connected to a lithium ion battery comprising a positive electrode comprising a lithium intercalation composition, a negative electrode comprising elemental carbon, a separator between the electrodes and an electrolyte comprising lithium ions. The processor generally is programmed to control the charging of the battery to a voltage of at least about 4.35V and to discharge the battery to a value of no more than about 2.25 volts at least one cycle of every 150 cycles.

In a further aspect, the invention pertains to a battery control system comprising a monitoring circuit, a charge-discharge circuit and a processor. The monitoring circuit is operably connected to a lithium ion battery comprising a positive electrode comprising a lithium intercalation composition, a negative electrode comprising elemental carbon, a separator between the electrodes and an electrolyte comprising lithium ions. Also, the processor can be programmed to discharge battery to a voltage of no more than about 2.25 volts through a connection to a discharge load distinct from the circuits for an associated electrical device powered by the battery when the device is connected to an external power supply, and subsequently to charge the battery to a voltage of at least about 4.35 volts.

In another aspect, the invention pertains to a method for cycling a secondary battery comprising a positive electrode comprising a lithium intercalation composition, a negative electrode comprising elemental carbon, a separator between the electrodes and an electrolyte comprising lithium ions. In some embodiments, the method comprises following the 20th charge-discharge cycle, discharging the battery to a voltage of no more than about 2.25 volts for one or more cycles to increase the capacity of the battery.

DETAILED DESCRIPTION OF THE INVENTION

Figure 1:
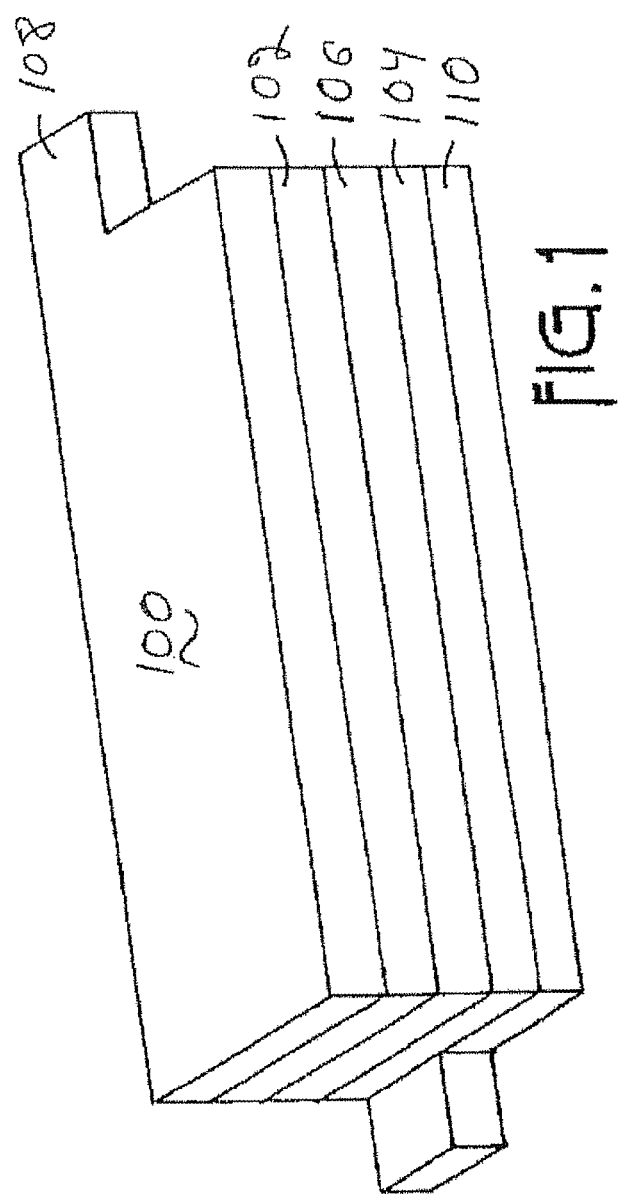
FIG. 1 is a schematic perspective view of battery electrodes assembled within a battery stack.

Procedures have been developed to improve the cycling performance of lithium ion batteries designed for cycling operation at relatively high voltages, in some embodiments at least about 4.35 volts. In particular, during the first charge cycle, irreversible changes generally take place within the battery. For secondary batteries, during the first charge step, lithium leaves the positive electrode active material and is inserted into the negative electrode active material. It has been found for higher voltage operation that improved cycling subsequently results if the battery is first charged to a lower voltage and then stored in an open circuit. It has been found that changes to the negative electrode can be introduced that significantly improve the cycling of the battery. It is believed that irreversible changes occur to the battery during the initial charge and/or the storage period. These changes can be reasonably associated with the formation of a more stable and possibly thicker solvent electrolyte interface layer. The length of the storage period surprisingly affects significantly the subsequent cycling of the battery. After performing the charge at the lower voltage and storage, the battery is charged at least to the specified operational voltage to activate the battery. Furthermore, it has been surprisingly discovered that the cycling capacity of the high voltage batteries is improved if a deeper discharge is used. Furthermore, it is even more surprising that the battery capacity can be recovered by performing a deeper discharge after initially cycling the battery at a less steep discharge. Thus, battery charging and discharging cycles can be controlled in a way to maintain a higher discharge capacity out to significantly longer numbers of cycles to increase the effective life of the battery. Thus, improved batteries formation and/or battery cycling control can lead to longer battery lifetime, which can cut battery costs significantly over the life of a device, especially if the device undergoes a lot of use involving many battery charge cycles.

The batteries described herein are lithium ion batteries in which a non-aqueous electrolyte solution comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or a similar process during discharge such that the positive electrode functions as a cathode which consumes electrons during discharge. Upon recharging of the secondary battery, the flow of lithium ions is reversed through the battery with the negative electrode taking up lithium and with the positive electrode releasing lithium as lithium ions. The operation of the battery at a higher charge voltage can provide for increased capacity for a quantity of positive electrode active material as well as potentially an increase in the average voltage such that a greater energy can be delivered.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

Lithium ion batteries described herein have achieved improved cycling performance while exhibiting high specific capacity and high overall capacity. High capacity positive electrode materials for the long cycle life batteries described herein can be produced using techniques that are scalable for commercial production. Suitable synthesis techniques include, for example, co-precipitation approaches or sol-gel synthesis. Use of a metal fluoride coating, metal oxide coating or other suitable coatings on the positive electrode active materials also can contribute to enhanced cycling performance. The positive electrode materials can also exhibit a high average voltage over a discharge cycle so that the batteries have high energy output along with a high specific capacity. Furthermore, in some embodiments, the positive electrode materials demonstrate a reduced irreversible capacity loss after the first charge and discharge of the battery so that negative electrode material can be correspondingly reduced.

While operating a battery at a greater voltage results in a correspondingly larger capacity, the high voltage operation generally results in poorer cycling performance. Specifically, the battery capacity tends to fade more quickly as a result of greater lithium extraction from the positive electrode to achieve the high capacity and high voltage performance. The improved procedures described herein provide for improvement in the cycling performance when the batteries are operated at a greater operating voltage. As a result of a relatively high tap density and excellent cycling performance, corresponding batteries can exhibit continuing high total capacity when cycled. The combination of excellent cycling performance, high specific capacity, and high overall capacity make these resulting lithium ion batteries an improved power source, particularly for high energy applications, such as electric vehicles, plug in hybrid vehicles and the like.

In some embodiments of particular interest, the lithium ion batteries can use a positive electrode active material that is lithium rich relative to a reference homogenous electroactive lithium metal oxide composition. Specifically, the reference material can be represented by the formula $LiMO_2$, where M is a metal or combination thereof with an average valance of +3. For example, $LiCoO_2$ and $LiNiO_2$ are positive electrode active materials in which Co and Ni are respectively in a +3 oxidation state, and corresponding mixed Ni and Co compositions can also be used in lithium ion batteries. The presence of the additional lithium in the lithium rich materials can contribute further to the capacity of the positive electrode material even though irreversible changes to the positive electrode material during the initial charge step may make at least some of the additional lithium unavailable for cycling. In particular, during the charging step, lithium ions leave the positive electrode material while lithium ions are taken up by the negative electrode active materials. When lithium ions leave the positive electrode active material, the other metals change oxidation state accordingly to maintain electrical neutrality and the released electrons flow from the positive electrode. If more lithium is available to leave the positive electrode active material, the capacity correspondingly can be greater.

In some embodiments, the positive electrode active materials of particular interest herein generally comprise manganese, nickel and cobalt as well as additional optional metals.

The initial target composition and approximate final composition of the lithium rich compositions can be represented by the formula $Li_{1+x}M_yO_2$, where M can be generally a mixture of metal ions. If $y=1-x$, then M has an average valance of $(3-x)/(1-x)$. The overall valance of M then is greater than +3. The material can comprise a small amount of a fluorine anion dopant that replaces a portion of the oxygen. The fluorine doped materials can be represented by the formula $Li_{1+x}M_yO_{2-z}F_z$, where z ranges from 0 to about 0.2. While not wanted to be limited by theory, it is believed in some embodiments that appropriately formed lithium-rich lithium metal oxides have a composite layered-layered crystal structure. In some embodiments with $y=1-x$, the positive electrode material can be represented in two component notation as b $Li_2MO_3 \cdot (1-b) LiM'O_2$ where M' is one or more metal cations with an average valance of +3 with at least one cation being $Mn^{+3}$ or $Ni^{+3}$ and where M is one or more metal cations with an average valance of +4. For example, in some embodiments of lithium rich materials, a $Li_2MnO_3$ material may be structurally integrated with a layered $LiMO_2$ component with generally representing a combination of transition metal elements, e.g. manganese cations along with other transition metal cations with appropriate oxidation states. X-ray diffractograms support this interpretation of the structure, as described in Thackery et al., "$Li_2MnO_3$-Stabilized $LiMO_2$ (M=Mn, Ni, Co) Electrodes for Lithium Ion Batteries," J. of Materials Chemistry (April 2007) 17, pp 3112-3125. These compositions are described further, for example, in U.S. Pat. No. 6,680,143 to Thackeray et al., entitled "Lithium Metal Oxide Electrodes for Lithium Cells and Batteries," incorporated herein by reference. Positive electrode active materials of particular interest have an initial target composition and final approximate composition represented by a formula $Li_{1+x}Ni_\alpha Mn_\beta Co_\gamma M_\delta O_2$, where x ranges from about 0.05 to about 0.25, α ranges from about 0.1 to about 0.4, β range from about 0.3 to about 0.65, γ ranges from about 0.05 to about 0.4, and δ ranges from about 0 to about 0.1, and where M is Mg, Zn, Al, Ga, B, Zr, Ti, Ca, Ce, Y, Nb or combinations thereof.

The voltage of the battery depends on the composition of the active materials. The voltage changes during the discharge cycle, as lithium is depleted form the negative electrode and lithium is loaded within the positive electrode active material. The cycling voltage is established to some degree during the initial charging of the battery. If the battery is charged to a higher voltage, a greater amount of lithium is depleted from the positive electrode and loaded into the negative electrode. While some materials are capable of charging to higher voltages, the batteries are observed to have inferior cycling properties if they are charged to higher voltages. Thus, when longer term cycling is desired, these materials can be cycled at lower voltages to achieve long term cycling with reasonable performance. Using selected materials to stabilize the battery cycling, lithium rich materials have been stably cycled at a lower voltage of 4.2V beyond 1000 charge/discharge cycles with relatively high capacity, as described further in copending U.S. patent application Ser. No. 12/509,131 to Kumar et al., entitled "Lithium Ion Batteries With Long Cycling Performance," incorporated herein by reference.

However, the cycling at lower voltage can sacrifice a significant portion of the battery capacity. Based on the initial battery charging and on the cycling approaches described herein, the cycling properties of the batteries can be significantly improved while operating at higher voltages. During the initial battery charge, irreversible changes in the battery generally are observed. For example, a solid electrolyte interface layer has been observed to form on the negative electrode active material. The solid electrolyte interface layer can comprise lithium ions and the reaction product of the electrolyte, organic solvent or the like. The positive electrode active materials may also undergo irreversible structural changes during the first charge of the battery. In particular, the charge voltage also determines to some degree the irreversible changes to the positive electrode active material, which can also change the cycling properties, and greater irreversible changes are generally expected with a greater charge voltage. These irreversible structural changes generally result in a significant difference between the first charge capacity and the first discharge capacity, which is referred to as irreversible capacity loss.

In general, it is desirable for the irreversible capacity loss to not be too large, but the irreversible changes to the materials are not necessarily all undesirable. In particular, a stable solid electrolyte interface layer is believed to stabilize the battery cycling by reducing the subsequent reaction of the electrolyte and/or solvent at the electrodes during cycling. Changes to the structure of the positive electrode active material may or may not be beneficial with respect to cycling, but these changes go along with the high voltage cycling of the lithium rich materials. On balance, it is desirable to lower irreversible capacity loss to the extent that longer term cycling is not detrimentally changed. Thus, with respect to the initial capacity of the cell, it is generally desirable to have a smaller irreversible capacity loss, but batteries exhibiting a larger irreversible capacity loss on the first cycle of the cell may have significantly improved longer term cycling properties that more than compensate for the irreversible capacity loss. In particular, the initial battery performance generally exceeds performance specification so that decreased fade from a slightly reduced initial performance can significantly increase the lifetime of the battery at the expense of a slightly reduced initial discharge capacity. An increased cycling specific capacity can also more than compensate for the inclusion of a slight increase in the amount of negative electrode active material, which can be provided in the battery to absorb at least some of the lithium that represents the irreversible capacity loss. As described herein, it is found that the SEI layer can be formed very stably during the low voltage open circuit rest period following an initial low voltage charge of the cell. The stability of the SEI layer can be measured through differential scanning calorimeter measurements. These improvements in the SEI layer formation would be expected to be beneficial for all lithium ion batteries that are ultimately cycled at higher voltages above 4.35 V.

The irreversible changes that take place in the first charging of the cell produces changes to the cell that are generally maintained to a significant degree as the cell cycles. Thus, one can refer to the first charge cycle as a formation step in which the cycling form of the battery is at least partially formed. More gradual changes to the battery may proceed after the formation step. With longer cycling of the battery, the capacity of the battery generally fades, which may be assumed to result from further irreversible changes to the battery material such as the active materials, the electrolyte, the solvent, the solid electrolyte interface layer or other components or interaction of components. However, for shorter numbers of cycles the capacity may increase, decrease or remain roughly constant.

It has been discovered that high voltage batteries can be formed for improved long term cycling using a procedure that involves a formation step at a voltage below the specified operational voltage of the battery. As noted above, the initial charge of the battery generally sets the voltage range for further cycling of the battery. However, the charging of the battery to its specified operating voltage or higher can be performed in steps to activate the battery for further use. This stepwise preparation of the battery with at least two steps has been discovered to result in significantly better cycling properties of the battery. It has also been discovered that storage of the battery, generally with an open circuit, after the initial charge is also very significant to achieve the desired improved cycling of the batteries.

Specifically, an initial charging step or formation charge can be performed at a voltage, for example, of no more than about 4.3 volts. In general, once the voltage reaches the selected value such as with a constant current or constant voltage charge, this voltage can be held for a period time to enable the formation process. During this initial charge and rest period, the irreversible changes to the battery presumably take place. After completion of the formation step at the selected low voltage, the battery is left in an open circuit for a period of time before further processing. The rest period is generally at least about 12 hours. Based on chemical kinetic principles, it is expected that the length of the rest period to achieve a desired formation process decreases with an increase in the temperature during the rest phase. In some embodiments, the rest period can be performed within a temperature range from about 15° C. to about 75° C. After the rest period, the battery is further charged, for example at a constant voltage, to a voltage value generally greater than about 4.35 volts, and this charging can be continued, for example, at least until the battery reaches a voltage at the higher selected voltage. Of course, based on this protocol, this charging procedure can be further divided into further steps. Once the battery is fully charged, the battery can be discharged to a selected voltage.

The conventional wisdom has been that a deep discharge of a lithium ion battery reduces the cycle life of the battery. Specifically, it is believed that the battery should not be discharged to a voltage that is too low as the battery is cycled to maintain a long cycle life. Furthermore, it has been believed that a particularly deep discharge of a lithium ion cell kills the battery so that it does not cycle properly after such a discharge. However, it has been discovered that with lithium rich high voltage materials described herein, the cycling of the battery actually improves with a deep discharge. Specifically, the batteries have better cycling properties if they are discharged down to a voltage of no more than about 2.25 volts, which is close to 100% of the capacity of the battery, based on the discharge curve. During discharge of the battery, lithium is taken up by the positive electrode active material, and a deep discharge represents a greater replacement of the lithium into this material. While not wanting to be limited by theory, this result suggests that the structure of the positive electrode active material is stabilized with respect to the battery cycling by the greater intercalation of lithium back into the positive electrode active material during the discharge.

As noted above, the improved cycling with a deeper discharge is contrary to the previous conventional wisdom. An even more surprising result has been discovered, and this is that the capacity actually recovers if a deep discharge is performed at a later cycling stage after a series of shallower discharges. Thus, at least some of the lost capacity that results from using a shallow discharge for a portion of the battery life can be later recovered subsequently through the use of a deep discharge. This discovery can be used to design improved charging components that take advantage of this observation to improve battery life.

In particular, the battery control system can comprise a monitoring circuit, a charging circuit, a processor and appropriate switches. The processor can be programmed to control battery charging and discharging to achieve desirable long term cycling performance of the battery. In some embodiments, conventional control systems can be adapted with appropriate programming to implement the improved battery control. Also, in additional or alternative embodiments, the battery control system can comprise a dissipation load that can be used to drain the battery down to a particular state of discharge prior to performing the charging of the battery. With respect to the programming, the control system can monitor that state of discharge at a time when a charging voltage is provided to charge the battery. If the voltage of the battery is above a selected cut off value, the control system can connect the battery to a dissipation load to lower the voltage below a selected value prior to charging the battery. The dissipation load can be selected to provide a desired current during the dissipation.

During operation of a device using a lithium ion battery, the user may pick various states of charge at which to perform a recharging step. In some embodiments, the dissipation of the battery can be performed prior to each charge if the voltage is not below a desired value when the charging voltage is supplied. In further embodiments, the dissipation can be performed intermittently to maintain the capacity of the battery with cycling. The intermittent dissipation can be performed, for example, after a certain number of battery cycles in which the voltage at charging is above the selected cut off value or after a certain number of cycles without reference to the parameters relating to previous charging steps or using an alternative algorithm. It may be desirable to repeat the deep discharge prior to charging for a plurality of cycles to achieve a desired level of improvement in battery capacity.

In some embodiments, the electronic device powered by the battery uses a voltage for the particular battery that is above the selected cut off value so that the device does not provide for natural discharge of the battery below the cut off value in standard use of the device. In these embodiments, the device indicates a discharged battery at the value of the operational voltage even if the battery actually retains capacity down to lower voltages. For these embodiments, the battery control system controls whether or not the battery is discharged to the desired discharge value either with each charging or intermittently. For example, the charging components can be designed to at least periodically discharge the battery down to a low voltage, such as below 2.2 volts such that the capacity can be improved for longer term cycling.

Through the improved battery management procedures described herein, the cycling performance of high voltage lithium ion batteries can be significantly improved such that the increased capacity available with a deeper charge can be exploited during the battery cycling. Since reasonable cycling performance is an important criterion for most battery applications, these improvements provide for the advantages provided by the increased capacity for appropriate applications while obtaining an appropriate number of cycles over the life of the battery.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is also a lithium intercalation/alloying material. If lithium metal itself is used as the anode, the resulting battery generally is referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\leq1$ or $Li_{1+x}Ti_{2-x}O_4$, $0\leq x\leq\frac{1}{3}$. Additional negative electrode materials are described in copending U.S. patent application Ser. No. 12/502,609 to Kumar, entitled "Composite Compositions, Negative Electrodes with Composite Compositions and Corresponding Batteries," and Ser. No. 12/429,438, now U.S. Pat. No. 8,277,974 to Kumar et al., entitled "Lithium Ion Batteries with Particular Negative Electrode Compositions," both of which are incorporated herein by reference.

However, the negative electrodes can generally comprise elemental carbon materials, e.g., graphite, synthetic graphite, coke, fullerenes, carbon nanotubes, other graphitic carbon and combinations thereof, which are expected to be able to achieve the long term cycling at higher voltages. Thus, for the long cycling, high energy density batteries of particular interest, the negative electrodes generally comprise an active elemental carbon material. Graphitic carbon generally comprises graphene sheets of $sp^2$ bonded carbon atoms. For convenience, as used herein graphitic carbon refers to any elemental carbon material comprising substantial domains of graphene sheets.

The positive electrode active compositions and negative electrode active compositions generally are powder compositions that are held together in the respective electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof.

The active particle loading in the binder can be large, such as greater than about 80 weight percent, in further embodiments at least about 83 weight percent and in other embodiments form about 85 to about 97 weight percent active material. A person of ordinary skill in the art will recognize that additional ranges of particles loadings within the explicit ranges about are contemplated and are within the present disclosure. To form the electrode, the powders can be blended with the polymer in a suitable liquid, such as a solvent for the polymer. The resulting paste can be pressed into the electrode structure.

The positive electrode composition, and in some embodiments the negative electrode composition, generally can also comprise an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 20 weight percent and in other embodiments from about 3 weight percent to about 15 weight percent distinct electrically conductive powder. A person of ordinary skill in the art will recognize that additional ranges of amounts of electrically conductive powders within the explicit ranges above are contemplated and are within the present disclosure.

Each electrode generally is associated with an electrically conductive current collector to facilitate the flow of electrons between the electrode and an exterior circuit. A current collector can comprise metal, such as a metal foil or a metal grid. In some embodiments, a current collector can be formed from nickel, aluminum, stainless steel, copper or the like. An electrode material can be cast as a thin film onto a current collector. The electrode material with the current collector can then be dried, for example in an oven, to remove solvent from the electrode. In some embodiments, a dried electrode material in contact with a current collector foil or other structure can be subjected to a pressure from about 2 to about 10 $kg/cm^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have relatively inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride and combinations thereof. In some embodiments of the battery, the electrolyte comprises a 1 M concentration of the lithium salts, although other larger and smaller concentrations can be used.

Further, it has been found that additives in the electrolyte can further stabilize a battery. In particular, electrolytes comprising ionic metal complexes and lithium salts, as described above, may provide added thermal stability and/or cycling stability to a battery. A class of ionic metal complexes that are of particular interest include lithium(chelato)borates and are described in U.S. Pat. No. 6,783,896 to Tsujioka et al. ("the '896 patent"), entitled "Electrolyte for Electrochemical Device," incorporated herein by reference. In particular, the ionic metal complexes in the '896 patent are formed as lithium salts for the formation of a lithium-based electrolyte with

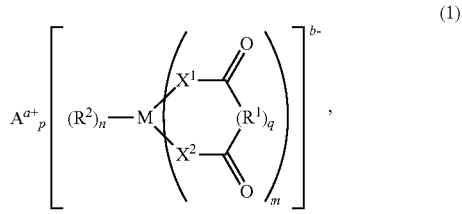

(1)

where a is a number from 1 to 3, b is a number from 1 to 3, p=b/a, in is a number from 1 to 4, n is a number from 1 to 8, q is 0 or 1, M is a transition metal or an element selected from groups 13-15 of the periodic table, $A^{a+}$ is a metal ion, onium ion or a hydrogen ion, $R^1$ is an organic group, $R^2$ is a halogen or an organic group, $X^1$ and $X^2$ are independently O, S or $NR^4$, and $R^4$ is a halogen or an organic group. Suitable organic groups for $R^1$, $R^2$ and $R^3$ are discussed further in '896 patent. Note that the '896 patent has an obvious error in their formulas with $A^{a+}$ incorrectly given as $A^{2+}$. Compositions of particular interest are represented by formulas where $A^{a+}$ is $Li^+$, the $R^2$ groups are halogen atoms and $X^1$ and $X^2$ are O atoms. The '896 patent exemplified $LiBF_2C_2O_4$ (lithium difluoro(oxalato)borate as an electrolyte salt or in an electrolyte blend with a distinct lithium salt.

Other lithium salts with anions based on metal complexes without a halogen are described further in U.S. Pat. No. 6,787,267 to Tsujioka et al. (the '267 patent), entitled "Electrolyte for Electrochemical Device," incorporated herein by reference. The '267 patent describes electrolytes represented by a formula:

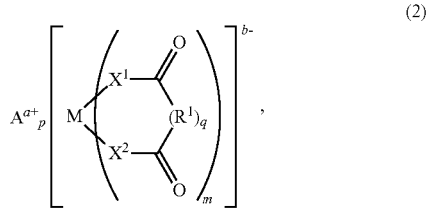

(2)

The same notation is used in formula (2) as is used for formula (1) above. One compound of interest within this genus is $LiB(C_2O_4)_2$, i.e. lithium bis(oxalato)borate. The combination of lithium bis(oxalato)borate with a solvent comprising a lactone is described further in U.S. Pat. No. 6,787,268 to Koike et al., entitled "Electrolyte," incorporated herein by reference. Additional or alternative useful additives for use in high voltage lithium ion batteries are described in U.S. patent application Ser. No. 12/630,992 to Amiruddin et al., entitled "Lithium Ion Battery With High Voltage Electrolyte and Additives," incorporated herein by reference.

For lithium ion batteries of interest, a non-aqueous liquid is generally used to dissolve the lithium salt(s). The solvent is generally inert and does not dissolve the electroactive materials. Appropriate solvents generally include, for example, ethylene carbonate, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. However, for high voltage operation, it has been found that solvents comprising mixtures of ethylene carbonate, a room temperature liquid solvent, such as dimethylcarbonate, methylethylcarbonate, γ-butyrolactone, γ-valerolactone or a mixture thereof. can be used to provide for a lithium ion battery to cycle more stably to higher voltage. It has been found that appropriately selected solvent compositions avoid oxidation at higher voltages and, therefore, these solvent combinations allow a battery to be charged to higher voltage values with improved stability. In some embodiments of the battery, the solvent can comprise ethyl carbonate:diethyl carbonate in a weight ratio of 1:2. Improvements resulting for appropriate solvent selection for high voltage battery operation are described in copending application Ser. No. 12/630,992 to Amiruddin et al., entitled "Lithium Ion Battery With High Voltage Electrolyte and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The testing in the Examples below is performed using coin cell batteries. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Positive Electrode Active Materials

The positive electrode active materials comprise lithium intercalating metal oxide compositions. In some embodiments, the lithium metal oxide compositions can comprise lithium rich compositions that generally are believed to form a layered composite structure. The positive electrode active compositions can exhibit surprisingly high specific capacities and high tap densities in lithium ion battery cells under realistic discharge conditions. The desired electrode active materials can be synthesized using synthesis approaches described herein.

In general, the lithium rich metal oxides can be approximately represented by a formula $Li_{1+x}M_yO_{2-z}F_z$, where x ranges from about 0.05 to about 0.25, y ranges from about 0.99 to about 0.65 and z ranges from 0 to about 0.2. In some compositions of particular interest, the initial target compositions and final approximate compositions can be described by the formula $Li_{1+x}Ni_\alpha Mn_\beta Co_\gamma A_\delta O_{2-z}F_z$, where x ranges from about 0.05 to about 0.3, $\alpha$ ranges from about 0.1 to about 0.4, $\beta$ range from about 0.3 to about 0.65, $\gamma$ ranges from about 0 (or about 0.001 if not zero) to about 0.4, $\delta$ ranges from about 0 to about 0.15 and z ranges from about 0 to about 0.2, and where M is Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit ranges above are contemplated and are within the present disclosure. The fluorine is a dopant that can contribute to cycling stability as well as improved safety of the materials. In embodiments in which z=0, this formula reduces to $Li_{1+x}Ni_\alpha Mn_\beta Co_\gamma A_\delta O_2$. It has been found that suitable coatings provide desirable improvements in cycling properties without the use of a fluorine dopant, although it may be desirable to have a fluorine dopant in some embodiments. Furthermore, in some embodiments it is desirable to have $\delta$=0. For these embodiments, if z=0 also, the formula simplifies to $Li_{1+x}Ni_\alpha Mn_\beta Ca_\gamma O_2$, with the parameters outlined above.

With respect to some embodiments of materials described herein, Thackery and coworkers have proposed a composite crystal structure for some lithium rich metal oxide compositions in which a $Li_2M'O_3$ composition is structurally integrated into a layered structure with a $LiMO_2$ component. The electrode materials can be represented in two component notation as b $Li_2M'O_3$ (1−b) $LiMO_2$, where M is one or more metal elements with an average valance of +3 and with at least one element being Mn or Ni and M' is a metal element with an average valance of +4 and 0<b<1. In some embodiments, 0.01≤b≤0.4, and in further embodiments, 0.02≤b≤0.3. For example, M can be a combination of $Ni^{+2}$, $Co^{+3}$ and $Mn^{+4}$, and M' can be $Mn^{+4}$. The approximate overall formula for these compositions can be written as $Li_{1+b/(2+b)}M'_{2b/(2+b)}M_{2(1-b)/(2+b)}O_2$. To satisfy this formula along with the formula of the previous paragraph, the sum x+$\alpha$+$\beta$+$\gamma$+$\delta$ of the positive electrode active material approximately equals 1.0. Batteries formed from these materials have been observed to cycle at higher voltages and with higher capacities relative to batteries formed with corresponding $LiMO_2$ compositions. These materials are described further in U.S. Pat. No. 6,680,143 to Thackery et al., entitled Lithium Metal Oxide Electrodes for Lithium Cells and Batteries," and U.S. Pat. No. 6,677,082 to Thackery et al., entitled "Lithium Metal Oxide Electrodes for Lithium Cells and Batteries," both of which are incorporated herein by reference. Thackery identified Mn, Ti and Zr as being of particular interest as M' and Mn and Ni for M.

The structure of some specific layered structures is described further in Thackery et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials. The examples below are based on the performance of a material with an initial target composition and the approximate final composition Li $[Li_{0.2}Mn_{0.525}Ni_{0.175}Co_{0.1}]O_2$. These materials can be synthesized as described below, and modified with a coating. The synthesis approach and the coating provide for superior performance of the materials with respect to capacity as well as cycling properties. These improved properties of the active material along with the approach for cell construction as well as the electrolyte additive provide for the improved battery performance described herein.

Synthesis Methods

Synthesis approaches described herein can be used to form layered lithium rich cathode active materials with improved specific capacity upon cycling and a high tap density. The synthesis methods have been adapted for the synthesis of metal oxide compositions described herein. The synthesis approaches are also suitable for commercial scale up. Specifically, co-precipitation process can be used to synthesize the desired lithium rich positive electrode materials with desirable results. In particular, a hydroxide co-precipitation approach as well as a carbonate co-precipitation approach has yielded active materials with very desirable properties. The synthesis of fluorine doped compositions is summarized below.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. The pH of the solution can then be adjusted, such as with the addition of $Na_2CO_3$ and/or other soluble carbonate salt, and optionally ammonium hydroxide, to precipitate a metal carbonate or metal hydroxide with the desired amounts of metal elements. Generally, the pH can be adjusted to a value between about 6.0 to about 12.0. The solution can be heated and stirred to facilitate the precipitation of the precursor metal carbonate or hydroxide. The precipitated metal carbonate or metal hydroxide can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal carbonate powder or metal hydroxide can then be subjected to a heat treatment to convert the carbonate composition to the corresponding oxide composition with the elimination of carbon dioxide or water. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the carbonate precursor or hydroxide precursor to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the carbonate or hydroxide material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, LiOH, $Li_2CO_3$, or a combination thereof, can be mixed with the precipitated metal precursor. The powder mixture is then advanced through the heating step(s) to form the oxide and then the crystalline final product material.

The carbonate co-precipitation process for lithium rich lithium metal oxides is described further in copending U.S. patent application Ser. No. 12/332,735 to Lopez et al., now U.S. Pat. No. 8,465,873, entitled "Positive Electrode Materials for High Discharge Capacity Lithium Ion Batteries," incorporated herein by reference. A hydroxide co-precipitation process for lithium rich lithium metal oxides is described further in U.S. patent application Ser. No. 12/246,814 to Venkatachalam et al., now U.S. Pat. No. 8,389,160, entitled "Positive Electrode Materials for Lithium Ion Batteries Having a High Specific Discharge Capacity and Processes for the Synthesis of These Materials," incorporated herein by reference.

The use of LiF to introduce the fluorine dopant during the oxidation steps has been described in U.S. Pat. No. 7,205,072, to Kang et al. (the '072 patent), entitled "Layered cathode materials for lithium ion rechargeable batteries," incorporated herein by reference. It has been proposed that fluorine dopant incorporation is reduced or eliminated in higher temperature processing due to volatility of LiF at high reaction temperatures. See Luo et al., "On the incorporation of fluorine into the manganese spinel cathode lattice," Solid State Ionics 180 (2009) 703-707. However, it would seem that reasonable adjustment of the reaction conditions should provide for some fluorine doping through the high temperature process. The use of a fluorine dopant in lithium rich metal oxides to achieve improved performance is described in copending U.S. patent application Ser. No. 12/569,606 to Kumar et al., entitled "Fluorine Doped Lithium Rich Metal Oxide Positive Electrode Battery Materials With High Specific Capacity and Corresponding Batteries," incorporated herein by reference. In general, fluorine dopants can be introduced using, for example, LiF and/or $MgF_2$ during an oxide formation step or, for example, reacting $NH_4HF_2$ with the already formed oxide at a temperature on the order of 450° C.

Coatings and Methods for Forming the Coatings

Inert inorganic coatings, such as metal fluoride coatings or metal oxide coatings, have been found to significantly improve the performance of the lithium rich layered positive electrode active materials described herein. In particular, the cycling properties of the batteries formed from the metal fluoride coated lithium metal oxide have been found to significantly improve from the uncoated material. Additionally, the overall capacity of the batteries also shows desirable properties with the fluoride coating, and the irreversible capacity loss of the first cycle of the battery is reduced. The first cycle irreversible capacity loss of a battery is the difference between the charge capacity of the new battery and its first discharge capacity. At least a significant portion of the first cycle irreversible capacity loss is generally attributed to the positive electrode material.

The coating provides an unexpected improvement in the performance of the high capacity lithium rich compositions described herein. In general, a selected metal fluoride or metalloid fluoride can be used for the coating. Metal/metalloid fluoride coatings have been proposed to stabilize the performance of positive electrode active materials for lithium secondary batteries. Similarly, a metal oxide coating can be used. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated with Fluorine Compound for Lithium Secondary Batteries and Method for Preparing the Same," incorporated herein by reference. This patent application provides results for $LiCoO_2$ coated with LiF, $ZnF_2$ or $AlF_3$. The Sun PCT application referenced above specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiNi_{1/3}Co_{1/3}Mn_{1/3}O_2$ is described further in an article to Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}Co_{0.1}Mn_{0.1}]O_2$ Cathode Materials," J. of the Electrochemical Society, 154 (11) A1005-A1009 (2007), incorporated herein by reference.

An increase in capacity and a reduction in irreversible capacity loss were noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. Metal oxide coatings, including $Al_2O_3$, MgO and $Bi_2O_3$ coatings, are described further in copending provisional patent application Ser. No. 61/253,286 to Venkatachalam et al., entitled "Metal Oxide Coated Positive Electrode Materials for Lithium Ion Batteries," incorporated herein by reference. The use of a $LiNiPO_4$ coating to obtain improved cycling performance is described in an article to Kang et al. "Enhancing the rate capability of high capacity $xLi_2MnO_3$ (1-x) $LiMO_2$ (M=Mn, Ni, Co) electrodes by Li—Ni—$PO_4$ treatment," Electrochemistry Communications 11, 748-751 (2009), incorporated herein by reference.

It has been found that metal/metalloid fluoride coatings can significantly improve the performance of lithium rich layered compositions for lithium ion secondary batteries. Generally, the coating improves the capacity of the batteries. See, for example, in copending U.S. patent application Ser. No. 12/246,814 to Venkatachalam et al., now U.S. Pat. No. 8,389, 160, entitled "Positive Electrode Materials for Lithium Ion Batteries Having a High Specific Discharge Capacity and Processes for the Synthesis of These Materials," copending U.S. patent application Ser. No. 12/332,735 to Lopez et al., now U.S. Pat. No. 8,465,873, entitled "Positive Electrode Materials for High Discharge Capacity Lithium Ion Batteries," and copending U.S. patent application Ser. No. 12/616,681 to Lopez et al., entitled "Coated Positive Electrode Materials for Lithium Ion Batteries," all three of which are incorporated herein by reference.

However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material. In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure.

The fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere. The formation of inert metal oxide coatings, such as metal oxide coatings and Li—Ni—$PO_4$ coatings are described in the references cited above.

Battery Formation Protocol

The high voltage batteries described herein can be initially prepared using a multiple step charging procedure for the first cycle involving an initial charge to a voltage below the operational voltage of the battery followed by a subsequent charge at least to the specified charged voltage of the battery. Between the charging steps, the battery is stored in an open circuit at the initial charge voltage to provide for desired formation of the battery. The initial charge can comprise a period with the application of a constant voltage, and the optional rest period with an open circuit can be used prior to a subsequent charging step. The improved preparation procedure during the first cycle provides surprisingly improved battery performance over longer term cycling of the battery. As used herein, the expression high voltage battery refers to batteries that are designed to operate at a voltage value of at least 4.35 volts, in other embodiments at least about 3.375V, in additional embodiments at least about 4.4V and in further embodiments from about 4.425V to about 4.8V. While not wanting to be limited by theory, it is generally believed that irreversible changes occur during the first charging of the battery, and that some of these changes can stabilize the battery for subsequent cycling. In particular, a solid electrolyte interface (SEI) layer is believed to generally form on the active material of the negative electrode. In addition, the lithium rich positive electrode active materials can undergo irreversible changes also during the first charge of the battery as lithium is removed from the material. The multiple steps charging process described herein may facilitate the formation of a more stable structure during the irreversible changes of the first charge cycle, which can be referred to as the formation cycle or the battery activation.

Specifically, in the improved cycling procedure, the first charge/discharge cycle of a high voltage battery comprises an initial charge step in which a battery is charged to a selected voltage value that is less than the specified fully charged voltage of the battery, which is used for subsequent cycling of the battery. After completion of the initial charge step, the battery can be allowed to rest in an open circuit configuration prior to undergoing a second charge step to a terminal voltage value that is at least equal to the specified fully charged voltage of the battery such that the battery is activated relative to its specified operational voltage. In particular, for a lithium ion battery, activation involves insertion of lithium into negative electrode active material, such as through intercalation or alloying of lithium with the negative electrode active material, and the lithium associated with the negative electrode active material is then available to leave the negative electrode active material during discharge. After charging to a voltage at least equal to the battery's fully charged cycling voltage, the battery can be discharged. In additional or alternative embodiments, additional charging steps can be included in the first charge of the battery. It is found that using this improved procedure for the initial cycle of the cell provides for improved battery cycle lifetime.

During the first cycle of a battery, the battery is prepared for subsequent cycling. In particular, it is believed that the battery electrodes undergo irreversible changes to the materials in the first cycle that can affect the performance characteristics of a battery. In light of these changes, the first charge/discharge cycle can be referred to as the formation or activation cycle, and the procedure for the first cycle can be referred to as the formation of the cell. For example, it is believed that during the formation cycle of a battery, compositions in the battery, e.g., a solvent composition and the electrolyte salt, can decompose and deposit on the negative electrode during charging and form a layer of material known as a solid electrolyte interface (SEI) layer. If the resulting SEI layer is effectively stable, the SEI layer can reduce further electrolyte decomposition on subsequent charging cycles of the battery. On the other hand, where the SEI layer is not stably formed, successive charge cycles may further irreversibly consume the battery electrolyte material or a component thereof, and the decomposition of the electrolyte can lead to a shortened battery cycle lifetime.

For the lithium rich materials described herein, the positive electrode active materials also generally undergo irreversible changes during the first charge of the battery. These irreversible changes can contribute to the irreversible capacity loss of the battery, which can be greater than the irreversible capacity loss attributable to the SEI layer. It has been found that coating the lithium rich materials can result in a decrease in the irreversible capacity loss, presumably related to the irreversible changes to the positive electrode active material. Nevertheless, significant irreversible changes occur in relationship with the lithium rich composition, and the loss of molecular oxygen has been observed in this context.

In some embodiments of the formation cycle, the selected voltage value of the initial charge is no greater than about 4.3 volts, in further embodiments no more than about 4.275 volts and in additional embodiments from about 4.0 volts to about 4.25 volts. In general, the initial lower voltage charge can be performed under a constant current charge, a constant voltage charge or a combination thereof. In some embodiments, it is desirable to use a constant voltage charge for this step. Regardless of the charging approach, the parameters of the charge can be adjusted such that the overall rate of performing this charge is at least about 30 minutes, in further embodiments for at least about 45 minutes, in additional embodiments from about 1.0 hours to about 12 hours and in other embodiments from about 1.5 hours to about 8 hours. A person of ordinary skill in the art will recognize that additional voltage ranges and charge time ranges within the explicit ranges above are contemplated and are within the present disclosure. In further embodiments, the initial charge may be selected so that the battery experiences essentially no voltage drop during a subsequent resting stage of the formation cycle.

Following the initial charge to the first selected voltage, it has been discovered that dramatically improved cycling results can be obtained when the first charge/discharge cycle described herein comprises a rest period wherein a battery is held in an open circuit configuration for a particular duration. In an open circuit configuration, no charge flows between the poles of the battery. It is expected that comparable results can be obtained with shorter rest periods at elevated temperatures. In general, the rest period for the battery can be performed at a temperature up to about 75° C., in further embodiments from about 15° C. to 65° C., in other embodiments from about 18° C. to about 60° C., and in additional embodiments from about 20° C. to about 55° C. The rest period can be performed at room temperature, e.g. 22° C. to 25° C. A person of ordinary skill in the art will recognize that additional ranges of temperatures within the explicit ranges above are contemplated and are within the present disclosure.

In some embodiments, the rest period comprises placing the battery in an open circuit configuration for at least about 0.5 days. In other embodiments, the rest period comprises placing the battery in an open circuit configuration for at least about 1 day. In further embodiments, the rest period comprises placing the battery in an open circuit configuration for from about 2 days to about 20 days, in additional embodiments from about 3 days to about 10, days, and in some embodiments from about 4 days to about 8 days. As the experimental results indicate below, a rest period of about 7 days at room temperature provides surprisingly improved cycling results, although shorter rest periods would be expected to result in desirable results for rest periods at elevated temperatures relative to room temperature. A person of ordinary skill in the art will recognize that additional ranges of time for the rest period within the explicit ranges above are contemplated and are within the present disclosure. During this storage or rest period, further formation of the SEI layer may take place or other stabilizing changes may take place within the battery, although we do not wish to be limited by theory. If the SEI layer does become thicker with a longer rest period, the observation that the performance peaks as a function of rest period suggests that lithium movement through the SEI layer can be restricted if the SEI layer is too thick. Also, an SEI layer that is thicker than desirable may contribute dead weight to the battery. Since the selected voltage generally is appropriately selected, the formation of the SEI layer and/or other formation processes can take place under appropriate low voltage situations without undesirable irreversible changes that have been observed to take place at high voltages for the initial charge.

Evidence is presented below that a longer rest period leads to a more stable and possibly thicker SEI layer. Specifically, based on differential scanning calorimeter measurements on the negative electrodes after formation indicate that the composition do not undergo decomposition until higher temperatures if the SEI layer is formed over a longer open circuit rest period. Specifically, the DSC plot as a function of temperature indicates that the negative electrode compositions can be stable to temperatures of at least about 128° C., in further embodiments at least about 130° C. and in additional embodiments from about 132° C. to about 160° C. The stability temperature is taken as the onset temperature. The onset temperature is obtained by drawing a tangent through the inflection point along the leading edge of a peak of the DSC curve, and the onset temperature is the temperature at which the tangent line intersects the baseline that reflects the heat capacity of the material. Also, the tip or highest point of a peak in the DSC plot can provide another reference point. A peak generally indicates a change, e.g., decomposition in the SEI layer associated with the negative electrode material. For the sake of clarity, the DSC measurements are taken by starting at a temperature of 30° C. and the temperature is increased at a rate of 10° C. per minute. A person of ordinary skill in the art will recognize that additional ranges of stable temperatures within the explicit ranges above are contemplated and are within the present disclosure.

A subsequent charge step of a first charge/discharge cycle generally comprises charging a battery to a terminal voltage value that is at least as great as the specified fully charged cycling voltage of the battery, which generally follows the rest period. During the subsequent charge step, the battery is further activated with respect to increasing the capacity due to incorporation of additional lithium into the negative electrode active material. This voltage for the subsequent charge step is greater than the initial charge of the first charge cycle. Additionally, the terminal voltage can be selected so as to avoid overcharge conditions wherein a battery undergoes undesirable irreversible processes. The voltage value at which overcharge conditions are present can be determined with reference to the particular battery chemistry. For the batteries described herein, the subsequent charge voltage generally is at least about 4.35 volts, in further embodiments from about 4.40 volts to about 4.8 volts, in additional embodiments from about 4.425 volts to about 4.75 volts and in other embodiments from about 4.45 volts to about 4.7 volts. A person of ordinary skill in the art will recognize that additional ranges of voltage are contemplated and are within the present disclosure. In general, while two charge steps are described herein to bring the battery up to a fully activated voltage, additional charge steps can be used to bring the battery up to the selected voltage for full activation during the first cycle. For example, three, four or more charging steps can be used to step the voltage up to the voltage for full activation. These additional steps can be used before the rest step, after the rest step or a combination thereof. However, if greater than two charge steps are used, one or a plurality of these charge steps generally combine to reproduce the conditions described above for the initial charge step with a rest prior to charge to the full cycling voltage. If a plurality of rest steps is used between charging steps, the rest steps may or may not be performed at the same temperature. Similarly, a rest step may not be performed at a constant temperature through the rest step, and the reference to a temperature of a rest step is considered the approximate average temperature unless indicated otherwise.

After the activation charge, the battery is discharged to complete the first charge/discharge cycle. For example, the battery can be discharged relatively deeply to a voltage of 2 volts. In some embodiments, the battery is discharged to a voltage below 2.75 volts, in other embodiments to a voltage from 1.5 volts to 2.65 volts, in additional embodiments from about 1.75 to about 2.6 volts and in further embodiments from about 1.8 volts to about 2.5 volts. A person of ordinary skill in the art will recognize that additional ranges of discharge voltages within the explicit ranges above are contemplated and are within the present disclosure. The battery generally is then charged again when ready for use. The battery can be partially charged to a selected voltage for distribution.

The charging of the battery generally is performed through the application of a suitable voltage across the poles of the battery. The charging can be controlled in appropriate ways. For example, the charge steps can comprises standard charging methods known in the art such as constant current (CC) charging, constant voltage (CV) charging, and mixed charging methods. During a CC charging process, a battery is charged to the selected voltage value by introducing an approximately constant current through the battery until the selected voltage value is reached. In a CV charging process, a battery can be charged to the selected voltage value by applying a constant voltage across the battery until the open circuit voltage reaches the selected voltage value and/or until a selected induced current is reached and/or a selected period of time has passed. In general, the particular charging steps can be divided, if desired, into multiple steps with different constant currents and/or constant voltages used for the respective steps. For example, a constant current can be used for a portion of a charge step and a constant voltage can be used for another part of the charge step.

In some embodiments of the formation cycle, the initial charge can comprises a constant current charge to the selected initial charge voltage, which is followed after the rest period by the constant voltage formation step. Overall, the steps combined are effectively a mixed charging process in which a battery can be charged by first using a constant current step until the selected voltage value is reached and subsequently, the battery can be further charged using a constant voltage charging method by applying a voltage across the battery at the selected voltage value for a selected amount of time and/or until a selected current value is induced in the battery. In the constant current charging step of the formation cycle, the battery can be charged at a current from about C/40 to about 5 C, in other embodiments from about C/20 to about 3 C and in further embodiments from about C/15 to about 2 C, until a selected voltage value is reached. A person of ordinary skill in the art will recognize that additional ranges of current within the explicit ranges above are contemplated and are within the present disclosure. The subsequent charging step to activate the battery can be performed using a constant voltage charge, although a constant current can be used in principle. Use of the multiple step formation procedure described herein can improve the cycle life of high voltage lithium ion batteries.

Battery Management System

The battery management system (BMS) that is described herein is designed to improve the performance of high voltage lithium ion batteries by advantageously managing charge/discharge cycling of the battery. It is generally observed that secondary batteries undergo capacity fade during charge/discharge cycling at large numbers of cycles. As used herein, "capacity fade" refers to capacity loss of a battery with use. Factors including, for example, rate of charge/discharge and depth of charge/discharge, are generally thought to affect the amount of capacity fade a battery experiences at high numbers of charge/discharge cycles. Specifically, deep discharge of lithium ion batteries has been generally believed to increase capacity fade such that the battery can experience fewer cycles before the battery no longer achieves a satisfactory performance. The BMS described herein manages battery charge/discharge cycling so that capacity fade during this process is reduced. In particular, the improved battery management is based on the unexpected result that a deeper discharge improves the long term cycling performance for the high voltage lithium ion batteries described herein incorporating lithium rich positive electrode active materials. Such an improved BMS comprises a monitoring circuit, a processor, and a charging circuit, which is interfaced with a high voltage battery, and the BMS is designed to implement discharge/charge procedures that take advantage of the unexpected discovery that deeper discharges can improve cycling life. Using such a BMS has been shown to increase the capacity of a high voltage battery at relatively large numbers of cycles.

As noted above, significant material changes can take place in the first charge of the battery. During normal operation after formation/preparation of the battery, a battery generally is discharged to provide electrical current to power an electrical device, such as a communication device, a motor, a digital processor or the like. At some time, the battery is recharged. In general, the operator of the corresponding electrical device selects the time to charge the battery, although the device or associated system may provide information to the user. In some embodiments herein, the charging process can be at least in part automatically controlled. The selected time for charging may or may not correspond with a state of discharge at which the battery properties are below the operational specifications of the electrical device that is powered by the battery.

There are several factors that contribute to capacity loss including, for example, depth of charge and discharge. During a charge step, lithium is depleted from the positive electrode active material and incorporated into the negative electrode active material. For the high voltage active materials described herein, a large fraction of the lithium can be removed from the positive electrode active material during the charge to high voltage. During discharge, the lithium is returned to the positive electrode active material, and in a deeper discharge, the positive electrode active material is returned close to the original composition. Thus, in the high voltage operation, the positive electrode active material undergoes significant compositional changes between its fully charged state and fully discharged state. Cycle fading is generally considered to result from changes to the structure of the electrode active materials and/or the electrolyte. The unexpected result that deep discharging improves cycling performance suggests that the positive electrode active material is stabilized in some sense upon insertion of a larger amount of the original lithium back into the positive electrode active material during a deep discharge. Of course, as noted above, the positive electrode active material at high voltage operation undergoes irreversible capacity loss due to changes in the material during the first charge-discharge cycle, and the amount of lithium that can be inserted back into the positive electrode active material during discharge is correspondingly less than the amount of lithium removed for the original positive electrode material during the first charge of the battery.

Figure 2:
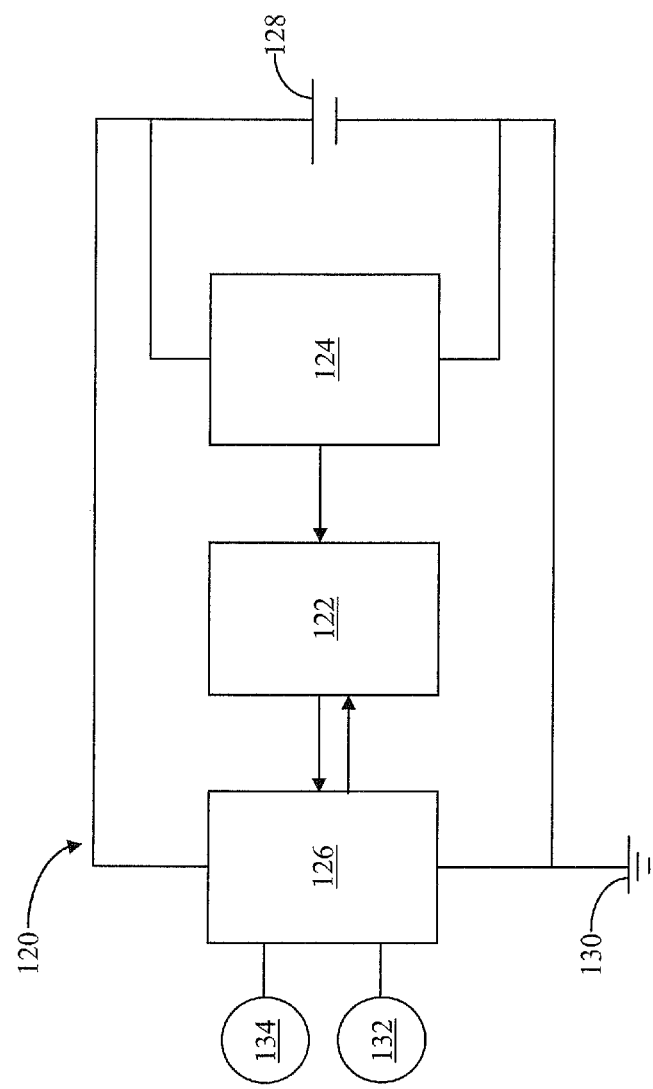
FIG. 2 is a schematic diagram of a battery management system.

The BMS described herein manages battery charge/discharge cycling so that capacity fade during battery cycling is reduced. Referring to FIG. 2, a BMS 120 that is designed to perform the improved battery management generally comprises a processor 122, a monitoring circuit 124, and a charge-discharge circuit 126, in which the BMS is interfaced with a high voltage lithium ion battery 128, electrical ground 130, functional device 132 and at appropriate times an external power source 134 for charging. Monitoring circuit 124 is designed to monitor the state of the battery and to relay that information to processor 122 of BMS 120. Processor 122 receives battery status information from monitoring circuit 124 as well as charging power availability information from charging circuit 126, and processor 122 is programmed to control battery discharging and charging to reduce battery fade. In particular, processor 122 may determine if battery discharge is performed prior to charging the battery, and the processor may communicate appropriate charge or discharge parameters to the charging circuit. Charge-discharge circuit 126 controls charge and discharge of battery 128, such as in accordance with instructions received from processor 122.

Suitable monitoring circuits, for example, can be adapted from conventional battery control circuits. Monitoring circuit 124 of the BMS can be capable of monitoring the state of the battery and generating a monitoring signal to relate the state of the battery to the processor. In some embodiments of the BMS, a monitoring circuit comprises a voltage monitoring circuit that can monitor the voltage of a battery and generate a monitoring signal that communicates the estimated voltage value to the processor. In additional or alternative embodiments of the BMS, a monitoring circuit can comprise a current monitoring circuit that can monitor the battery current and generate a monitoring signal that communicates the estimate of the current value to the processor. In further embodiments of the BMS, the monitoring circuit can comprise a voltage monitoring circuit and a current monitoring circuit. In general, a specific voltage monitoring circuits and/or current monitoring circuits can be designed based on the particular electronic device powered by the battery or batteries and can be selected with reference to the specified cycling parameters of a battery. Examples of monitoring circuits for portable electronic devices are described further in U.S. Pat. No. 7,496,460 to Hornick et al., entitled "Energy Source Monitoring and Control System for Power Tools," incorporated herein by reference. Battery control circuits with a current measuring circuit and a voltage measuring circuit are described further in U.S. Pat. No. 6,140,928 to Shibuya et al., entitled "Remaining Battery Capacity Measuring Device," incorporated herein by reference.

Charge-discharge circuit 106 of the BMS may be capable of controlling the charging and discharging a battery using, for example, constant charge charging methods and/or constant voltage charging methods. In general, charge-discharge circuit 140 can be adapted from conventional battery charge-discharge circuits with appropriate modifications. Battery charge-discharge circuits are described further, for example, in U.S. Pat. No. 5,493,197 to Eguchi et al., entitled "Battery Charge Control Circuit," and U.S. Pat. No. 7,276,881 to Okumura et al., entitled "Protection Method, Control Circuit, and Battery Unit," both of which are incorporated herein by reference. Battery charging systems for hybrid vehicles and electric vehicles are respectively described in U.S. Pat. No. 6,075,346 to Kikuchi et al., entitled "Secondary Battery Charge and Discharge Control Device," and U.S. Pat. No. 7,053,588 to Nakanishi et al., entitled "Power Supply Controller, Electric Vehicle and Battery Control Unit," both of which are incorporated herein by reference.

Figure 3:
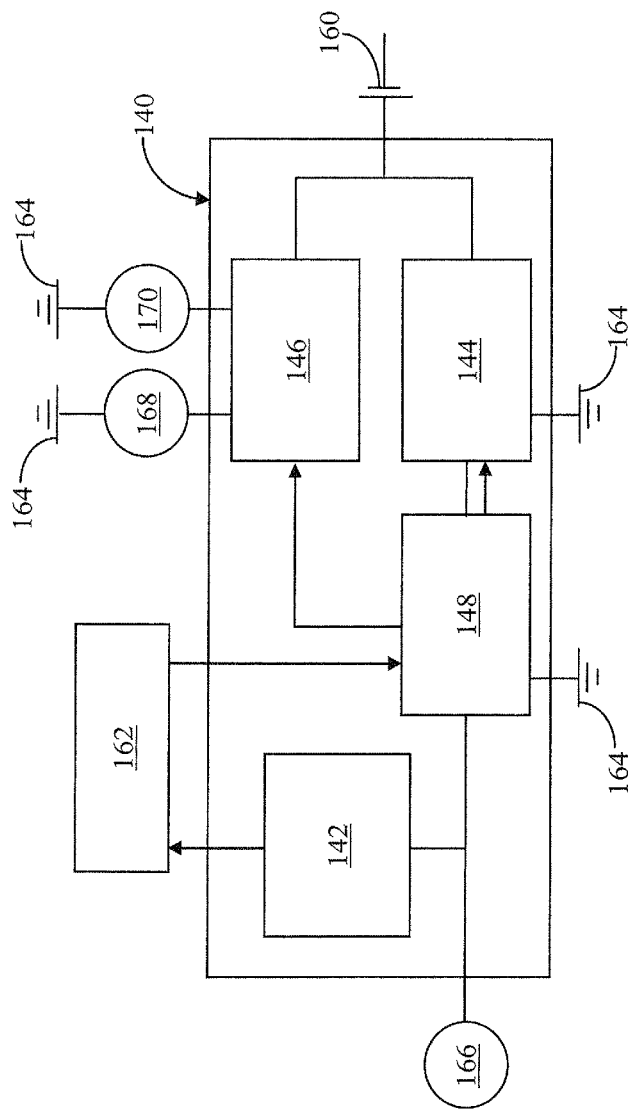
FIG. 3 is a schematic diagram of a charge-discharge circuit.

Referring to FIG. 3, in some embodiments a charge-discharge circuit 140 generally can comprise a connection detecting circuit 142, a charging switch 144, a discharging switch 146, and a charge controller 148. As shown in FIG. 3, charging circuit 144 is also connected to battery 160, processor 162, electrical ground 164 and at appropriate times external power source 166. Connection detection circuit 142 can detect if external power supply 166 is available to supply power to the BMS to charge the battery and generates a signal to communicate this power availability information to processor 162. Discharge switch 146 can be electrically connected to a device load 168 and a dissipative load 170, where the device load involves the powering of the associated functional electrical device and the dissipative load can correspond with a load used to dissipate battery current prior to charging. Dissipative load 170 may comprise a resistor to provide a reasonable current based on the battery capacity or other suitable load. Discharge switch 166 can comprise a plurality of switches to provide the desired functionality. In some embodiments, it may be desirable to provide for use of the functional electronic device with power supplied from the external power source while the battery is discharged and/or charged.

When charge-discharge circuit 126 is signaled by processor 162 to charge battery 160, charge controller 148 can signal charging switch 144 to open and discharging switch 146 to close. In some embodiments of the BMS, both charging switch 144 and discharge switch 146 can be simultaneously open, with the discharge switch open to the device load, to provide power to the electrical device at the same time in which battery 160 is charged, although the charging time may correspondingly increase. Charge controller 148 can charge a battery at a preselected current, $I_0$. In other embodiments of the BMS, charge controller 148 can charge a battery sequentially at a plurality of preselected current values $\{I_n\}$, where $n=1, \ldots, N$ and where N is the number of preselected current values. Similarly, in further embodiments of the BMS, charge controller 148 can charge a battery by applying a preselected voltage, $V_0$, across a battery. In other embodiments of the BMS, charge controller 148 can charge a battery sequentially at plurality of preselected voltage values $\{V_m\}$, where $m=1, \ldots, M$ and where M is the number of preselected voltage values. Similarly, charge controller 148 can perform the charging using a sequential combination of constant current and constant voltage steps. Charging switch 144 can be closed when the desired state of charge is achieved for battery 160, which can be evaluated, for example, based on the open current voltage of the battery.

Potential states of the charge-discharge circuit depend on the availability of external power. In particular, if external power is not available, then only the battery or batteries are available to provide power to operate the electronic device. If the battery(ies) have sufficient remaining capacity to operate the electronic device, then the device may or may not be powered on. If the device is powered on, the processor provides instructions to the charge-discharge circuit to discharge the battery through the electrical device. Alternatively, the device can be powered down such that the device is either in completely unpowered state or in a low power monitoring state or sleep state. Thus, when charge-discharge circuit 140 receives a signal from processor 162 to discharge battery 160 to power the electrical device, the charge-discharge circuit closes charging switch 144 and opens discharging switch 146 to the device load. In alternative or additional embodiments, the discharging switch is directly controlled by a user through the pressing of a button, the movement of a manual switch or actuation of another appropriate input component. In general, the operation of the device when an external power source is not available can be conventional.

In general, when an external power source is connected to the battery management system, connection detecting circuit 142 provides an appropriate signal to processor 162. This signal generally initiates instructions to provide for charging of the battery(ies). In some embodiments, processor 162 of the BMS can interpret the state the BMS in view of determining an advantageous approach for charging the battery. In some embodiments of the BMS, the processor can determine the state of the BMS by interpreting monitoring signals generated by a monitoring circuit and a charge-discharge circuit. In such embodiments, the state of the BMS can include, for example, the open circuit voltage of the battery. Furthermore, the processor can evaluate the state of the BMS at least in part by interpreting stored charge history data kept by the processor. If historical data is maintained, this data can comprise, for example, the battery voltage at which at least some previous charges were initiated and/or the number of times the battery has been charged since last being discharged to lower selected discharge voltage value. In general, the processor can determine the state of the battery by interpreting monitoring signals from the monitoring circuits.

In addition, for evaluating the charging parameters, the processor can further evaluate the state of the electronic device, i.e., whether or not the electronic device is in a powered state. If the electronic device is powered on, the processor can open both a discharge switch connected to the device load and a charging switch such that the external power source is both powering the electronic device and charging the battery. If the electronic device is powered down, generally the device operates in at least a low power mode to provide power for at least the processor and charge-discharge circuits as well as possibly status displays. In some embodiments, the user may determine when to provide an external power source to initiate the battery charging. The electronic device generally has a lower cut-off battery voltage to power the electronic device. The user may or may not supply external power when the battery is at or near the lower cut-off voltage for operating the electrical device. Also, the lower cut-off voltage for operating the electrical device may or may not be above the target stabilizing discharge voltage to improve battery longevity.

The processor of the BMS may control the charging and/or discharging processes by sending control signals to a charge-discharge circuit. The processor can control the charging process of a battery, for example, by sending a control signal to the charging circuit communicating appropriate switch connections and/or charging parameters. Appropriate charging parameters may include, for example, the charging method and/or charging rate and/or the like. Similarly, the processor can control the discharging process of a battery by sending a control signal to the charge-discharge circuit communicating appropriate discharging parameters. Appropriate discharge parameters can include, for example, whether or not a battery should be discharged to a dissipation load prior to performing the battery charging.

Furthermore, the processor of the BMS generally can continue to receive monitoring signals from a charge-discharge circuit and/or a monitoring circuit of the BMS during the charging and/or discharging processes. As a result, the processor of the BMS can determine when it is advantageous to stop the charging and discharging processes. The processor can stop the charging process by sending a control signal to the charging circuit to stop the charging process, for example, by opening the charging switch termination the application of charging current form the external power source. Similarly, the processor can stop the discharging process by sending a control signal to the charge-discharge circuit to stop the discharging process, for example, by opening a discharge switch. It is generally desired to avoid overcharging the battery since overcharging the battery can damage the battery.

Thus, charging is generally stopped once the battery has reached the specified charge voltage for the battery. A separate overcharge protection circuit can be used in addition to or as an alternative to the processor controlling the termination of the charging process.

The processor of the BMS can be programmed to determine when to advantageously charge and discharge a battery. This determination, and therefore the specific embodiment of the processor programming, is highly dependent on the particular embodiment of the BMS. In some embodiments, the processor can be programmed to operate the system in either of two modes: a charge only mode and a charge/discharge mode. The processor may have a default mode involving an evaluation by the processor of whether or not to further discharge the battery prior to charging to decrease battery fade. In some embodiments, a user can control the operating mode of a processor using an input device that sends a control signal to the processor, which may override a default mode of the processor. When operating in a charge only mode, a processor can determine if an external power supply is available such that a battery can be advantageously charged and, subsequently, starts and stops the charging process. When operating in a charge/discharge mode, a processor can first determine whether a battery can be advantageously discharged prior to charging once an external power source is available.

For the high voltage battery compositions of interest herein, it has been found, surprisingly, that battery capacity fade can be reduced by discharging the battery to lower voltage values prior to charging. As a result, the capacity fade of a battery can be reduced by charging the battery when the open circuit voltage of the battery is in a greater depth of discharge. For the high voltage batteries described herein, it has also been surprisingly found that even intermittently discharging the battery below a target stabilizing discharge voltage prior to charging can improve battery capacity and correspondingly reduce battery fade. Thus, it may be desirable to discharge the battery before charging the battery when an external power source is available. Generally, the dissipation is performed with respect to a separate dissipation circuit although the dissipation can be performed with current supplied to the electronic device or other functional circuit if the battery has sufficient voltage for the functional circuit and if the particular functional circuit is in a powered on status. When the battery is discharged prior to initiating the charging process, the discharge can be performed to a target stabilizing discharge voltage. For the high voltage batteries described herein, the batteries can be discharged prior to charging to a stabilizing voltage in some embodiments of no more than about 2.25 volts, in other embodiments no more than about 2.2 volts, in further embodiments from about 2.15 volts to about 1.5 volts and in additional embodiments from about 2.05 volts to about 1.75 volts. A person of ordinary skill in the art will recognize that additional ranges of voltage within the explicit ranges above are contemplated and are within the present disclosure.

In general, under the control of the processor, the dissipative discharge to a selected stabilizing discharge voltage can be performed prior to each charge if the initial voltage is greater than the selected target stabilizing discharge voltage when the external power source is provided. However, this may be undesirable in some embodiments for several reasons. For example, the dissipative discharge may add to the time to reach a fully charged battery. This additional time may be particularly notable when the charging process is initiated from a relatively charged state of the battery. For some devices, the user can supply an external power source at any desired time, which may be prior to the battery reaching the voltage at which the battery is at the lowest operating voltage of the electrical device. For example, the user may supply an external power source, e.g. plug in the device, when a significant amount of battery capacity remains. To then fully discharge the battery prior to charging the battery may be undesirable with respect to the waste of energy as well as the large prior of time would then be needed to discharge the battery at a reasonable rate.

In some embodiments, the battery is dissipatively discharged prior to charging only when the charging process is initiated when the battery voltage is below a selected cutoff value. The cutoff value can be selected based on the particular battery design, and in some embodiments the cutoff value can be about 2.8 volts, in further embodiments about 2.75 volts and in additional embodiments about 2.6 volts. In additional or alternative embodiments, the battery can be discharged prior to charging at least for one cycle out of a selected number of cycles. For example, the battery can be discharged prior to charging at least for one cycle out of every 150 cycles, in further embodiments, at least one cycle out of every 75 cycles, in additional embodiments at least one cycle for every 50 cycles and in other embodiments at least one cycle for every 25 cycles. It may be desirable to perform a series cycles grouped together with dissipation prior to charging to improve the battery capacity, although these may not be immediately adjacent if the other parameters of the charge process are undesirable, such as the initial battery voltage indicating a low initial state of discharge. Thus, in some embodiments, it is desirable to discharge prior to charging for at least 5 of 10 charge cycles and in further embodiments at least about 7 of 10 charge cycles. A person of ordinary skill in the art will recognize that additional ranges of voltage or cycle selection within the explicit ranges above are contemplated and are within the present disclosure.

In general, the battery and BMS influence the charging and discharging rates. With respect to discharge during powering of the electronic device, in general the battery(ies), BMS and the electronic device are designed to provide appropriate current and voltage to drive the electronic device at the normal operating parameters of the electronic device. In particular, the impedance of the overall circuit can be adjusted appropriately to provide the appropriate current during powering of the electronic device. In some embodiments, the average operating current for the electrical device is generally no more than about a 0.5 C discharge rate. Similarly, the dissipative load can have an impedance to provide a reasonable current for dissipating the battery to the target stabilizing voltage. For example, the resistance can be selected for the dissipative load such that along with the remaining portions of the circuit the current corresponds with a current approximately no more than an equivalent of a C rate discharge, in further embodiments no more than a 0.5 C discharge and in other embodiments no more than about 0.4 C discharge. Similarly, the charge current can be controlled to provide for a current within a desired range. For example, the charge current can be no more about 2 C, in further embodiments, no more than about C and in other embodiments no more than about 0.5 C. A person of ordinary skill in the art will recognize that additional ranges of discharge and charge rates within the explicit ranges above are contemplated and are within the present disclosure.

EXAMPLES

The battery testing in Examples 1 and 2 were performed using coin cell batteries produced following a procedure outlined here.

Positive electrodes comprised coated lithium metal oxide particles, electrically conductive particles and a binder coated onto an aluminum foil current collector. The lithium metal oxide particles comprises a lithium rich layer-layer composition approximately represented by the formula $Li_{1.2}Ni_{0.175}Co_{0.10}Mn_{0.525}O_2$. The lithium metal oxide composition was synthesized using a carbonate co-precipitation process, and the lithium metal oxide particles were subsequently coated with aluminum fluoride ($AlF_3$) at a thickness from about 6-8 nm. Further details of the of carbonate co-precipitation and coating processes can be found in co-pending U.S. patent application Ser. No. 12/332,735 to Lopez et al, now U.S. Pat. No. 8,465,873, entitled "Positive Electrode Materials for High Discharge Capacity Lithium Ion Batteries," incorporated herein by reference.

The aluminum fluoride coated lithium metal oxide powder was mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Honeywell—Riedel-de-Haen) and stirred overnight to form a PVDF-NMP solution. The mixture comprised at least about 75 weight percent active metal oxide, at least about 3 weight percent acetylene black, at least about 1 weight percent graphite and at least about 2 weight percent polymer binder. The homogeneous powder mixture was then added to the PVDF-NMP solution and mixed for about 2 hours to form a homogeneous slurry. The slurry was applied onto an aluminum foil current collector to form a thin wet film using a doctor's blade coating process. A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness.

A coin cell battery was formed from the positive electrodes formed as described above. The positive electrode was placed inside an argon filled glove box for the fabrication of the coin cell batteries. The negative electrode comprised at least about 75 weight percent graphite and at least about 1 weight percent acetylene black with the remaining portion of the negative electrode being polymer binder. The acetylene black was initially mixed with NMP solvent to form a uniform dispersion. The graphite and polymer were added to the dispersion to form a slurry. The slurry was applied to a copper substrate to form the negative electrode after drying. An improved electrolyte was used as described in copending U.S. patent application Ser. No. 12/630,992 to Amiruddin et al, filed on Dec. 4, 2009, entitled "Lithium Ion Battery With High Voltage Electrolytes and Additives," incorporated herein by reference. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Example 1

Effect of Cell Formation Protocol on Battery Capacity Fade

This example shows the effect of the cell formation protocol on the battery capacity fade. First, two batteries were constructed as described above. Subsequently, one battery was formed using formation protocol A and the other battery was formed using formation protocol B. Formation protocol A comprised a first charge of a battery to 4.6 volts at a constant current of C/10. Subsequently, the battery was held at a constant voltage of 4.6 volts for 4 hours prior to resting in an open circuit configuration for 7 days. The battery was then discharged to 2.0 volts at a constant current of C/10. Formation protocol B comprised a first charge of a battery to 4.2 volts at a constant current of C/10. Subsequently, the battery was held at a constant voltage of 4.2 volts for 4 hours prior to resting in an open circuit configuration for 7 days. Alternative lengths of the rest period are described further below. The battery was then charged to 4.6 volts at a constant current of C/10 prior to being discharged to 2.0 volts at a constant current of C/10.

Following formation, the capacity-cycle data was generated for each battery by charging a battery to 4.6 volts at constant current and discharging the battery to 2.0 volts at constant current. For the next three charge/discharge cycles following the first cycle formation, the batteries were charged and discharged at a rate of C/5. Thereafter, the batteries were charged and discharged at a rate of C/3.

Figure 4:
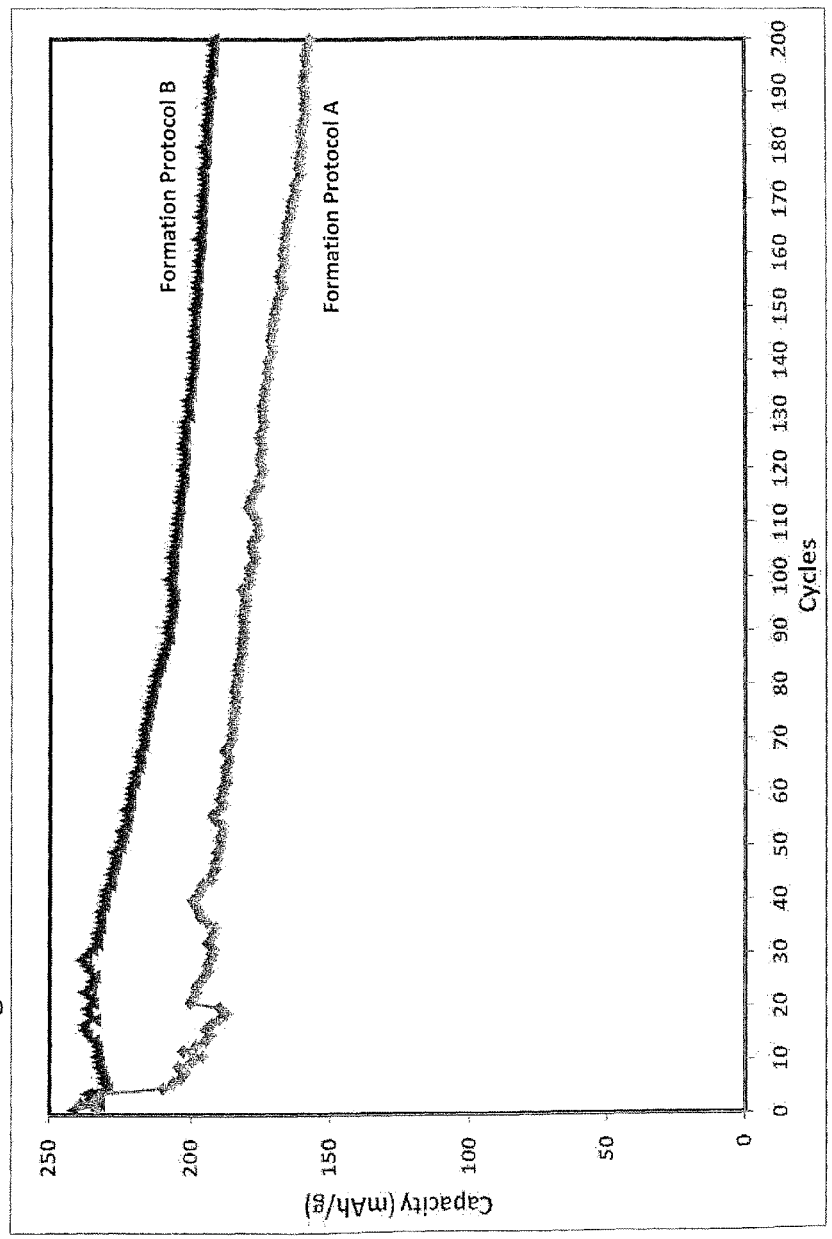
FIG. 4 is a plot of discharge specific capacity as a function of cycle number for high voltage lithium ion batteries formed with two different formation protocols.

The effect of the cell formation protocol on battery capacity fade can be seen in FIG. 4. The formation protocol B results in significantly decreased capacity fade during cycling relative to formation protocol A. In particular, the battery formed using protocol A has a specific capacity at the 200th cycle of about 158 mAh/g and experiences a 25-26 percent capacity fade between the 5th discharge cycle (210 mAh/g), where the C/3 rate is first used, and the 200th cycle. On the other hand, the battery formed with formation protocol B has a specific capacity at the 200th cycle of about 193 mAh/g and experiences a 16-17 percent capacity fade between the 5th discharge cycle (232 mAh/g) and the 200th cycle. Thus, the batteries formed with formation protocol B have a significantly greater capacity at the 200th cycle as well as a decreased fade during the cycling at the C3 rate and a decreased fade during the initial cycles of the battery at lower rates.

Figure 5:
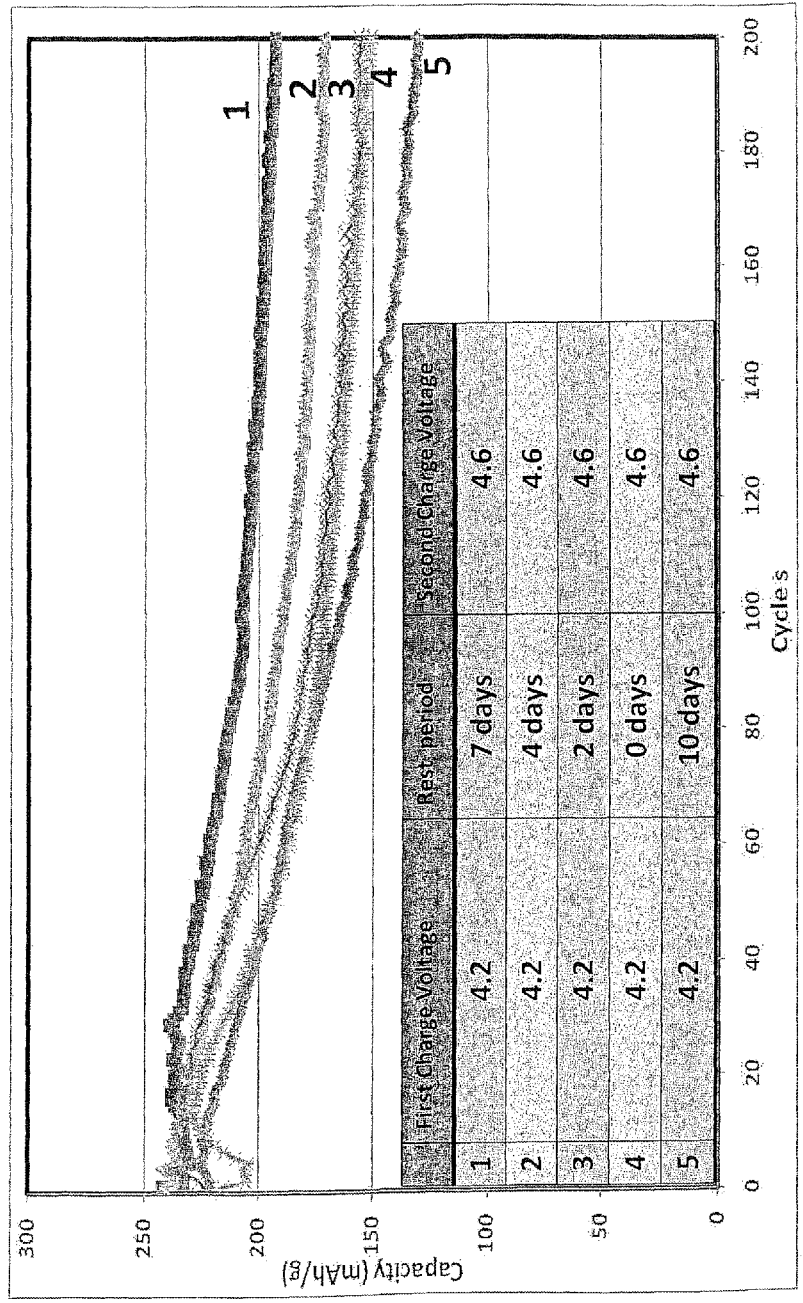
FIG. 5 is a set of plots of specific discharge capacities as a function of cycle number for batteries formed with 5 different lengths of open circuit rest periods (0 days, 2 days, 4 days, 7 days and 10 days) after an initial charge to 4.2V.

The effect of the rest period at open circuit was also studied. Surprisingly, there was a peak in the performance with respect to the length of time of the rest period. Specific capacity for cycling up to 200 cycles are compared in FIG. 5 for 0 day, 2 day, 4 day, 7 day and 10 day rest times during formation protocol B described above. The seven day results were significantly improved over the shorter rest periods, and the 10 day rest period results were the worst performers at 200 cycles. These surprising results indicate that the length of the rest period is important with respect to the formation process and long cycling stability and that the specific length of rest period is also significant.

The properties of the negative electrode (anode) were studied to understand better the properties of the electrodes following the formation and the differences resulting from the different lengths of the rest period at an open circuit following charging to an initial voltage. Specifically, differential scanning calorimetry results were obtained on negative electrodes removed from the batteries after completing the formation protocol. The negative electrodes are removed after a complete discharge of the cell to eliminate a substantial amount of the lithium. In the DSC measurement, the temperature was scanned from 30° C. to 400° C. at a rate of 10° C. per minute. Above, 250° C. the carbon structure collapses. Measurements indicating a phase change below 250° C. can be associated with decomposition of the SEI layer.

Figure 6:
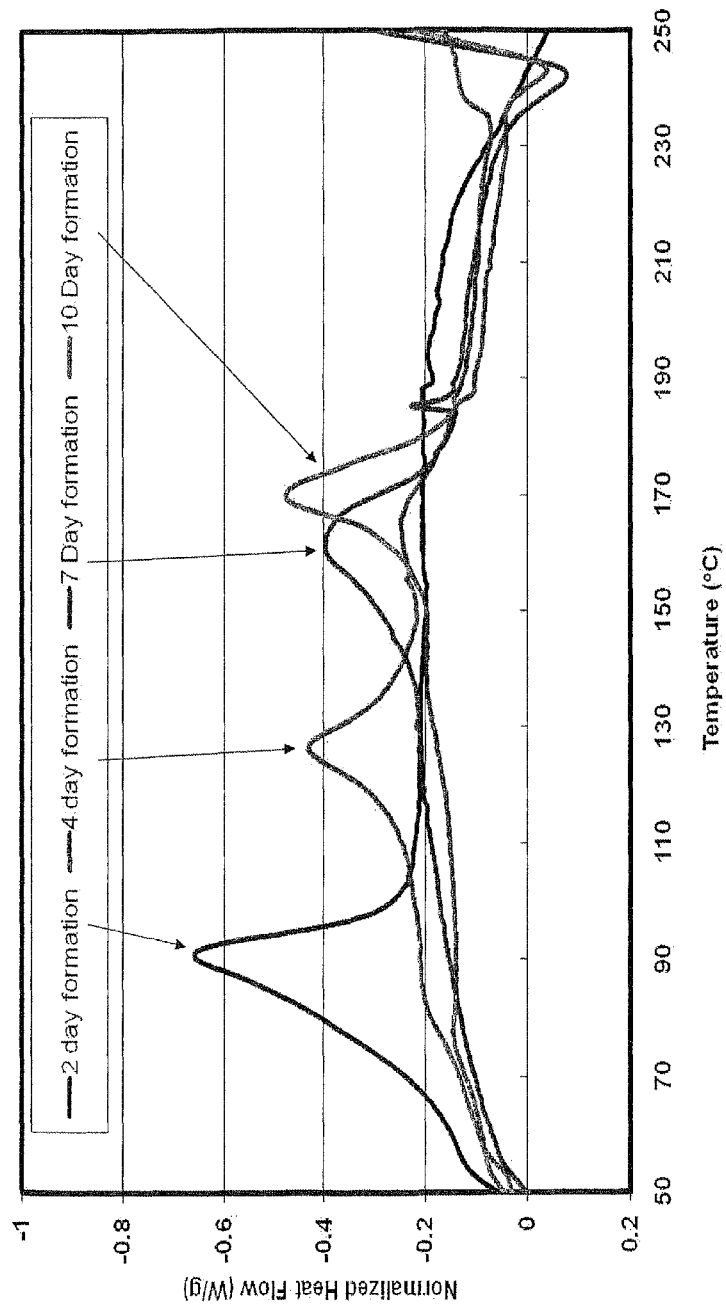
FIG. 6 is a plot of differential scanning calorimeter measurements for negative electrodes removed from batteries that are fondled with different lengths of rest periods, 2 days, 4 days, 7 days or 10 days.

The DSC results are plotted in FIG. 6 for batteries having rest periods of 2 days, 4 days, 7 days and 10 days. The raw data was normalized by the weight of the material With a 2 day rest period during formation, a change in the anode material is observed at an onset temperature of about 74° C. and a peak temperature of about 91° C. With a 4 day rest period during formation, the anode material exhibits a reaction or phase change with an onset temperature of about 109° C. with a peak temperature of about 126° C. With 7 day and 10 day rest periods, the anode material does not exhibit onset temperatures of about 143° C. and 150° C. and peak temperatures of about 161° C. and about 165° C., respectively.

These DSC results for the batteries described herein can be interpreted as reflecting a more stable and possibly thicker SEI layer forming at the negative electrode active materials with an increase in the length of the rest period. This interpretation of the SEI formation is further supported by measurements of the irreversible capacity loss. Specifically, the irreversible capacity loss increased with the increase of the rest period, which suggests that additional amounts of lithium are consumed by the formation of the SEI layer with an increase in the rest period. The irreversible capacity loss values are given in Table 1 below. The significantly reduced specific capacity observed for the batteries formed with a 10 day rest period suggests that there are limits to the desirability of the thickness or stability of the SEI layer.

Figure 7:
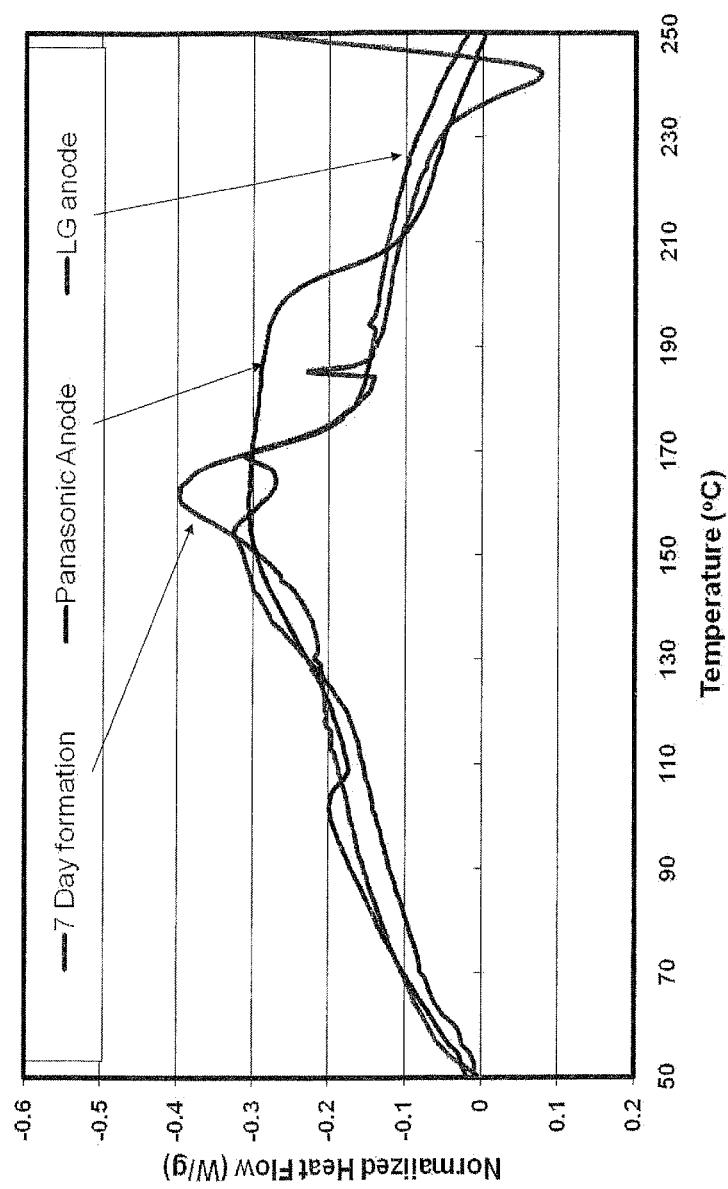
FIG. 7 is a plot of normalized differential scanning calorimeter measurements for negative electrodes formed with a 7 day rest period along with measurements for the negative electrodes from two commercial batteries.

For comparison, negative electrodes were obtained from two commercial batteries. These batteries were an 18650 battery from LG Corporation and an 18650 battery from Panasonic. The batteries would be placed into commercial circulation following appropriate activation steps involving the formation of the SEI layer. The DSC results for the two commercial batteries are plotted in FIG. 7 along with the DSC results obtained with the batteries described herein based on a 7 day rest period. The commercial batteries exhibited an onset temperature corresponding to reaction or phase change presumably caused by SEI layer decomposition at lower temperatures relative to the negative electrodes from the batteries formed as described herein with appropriate rest periods. The decomposition of the SEI layers for the commercial batteries exhibited broad peaks. The results of the characterization of the batteries are summarized in Table 1.

TABLE 1

| Formation | Onset (° C.) | Δ H (J/g) | Peak position (° C.) | Irreversible capacity loss (mAh/g) |
|---|---|---|---|---|
| 0 days | | | | 55 |
| 2 days | 74 | 51 | 91 | 60 |
| 4 days | 109 | 96 | 126 | 61 |
| 7 days | 143 | 99 | 161 | 64 |
| 10 Days | 150 | 81 | 165 | 65 |
| LG | 124 | 90 | 159 | |
| Panasonic | 70 | 139 | 160 | |

Figure 8:
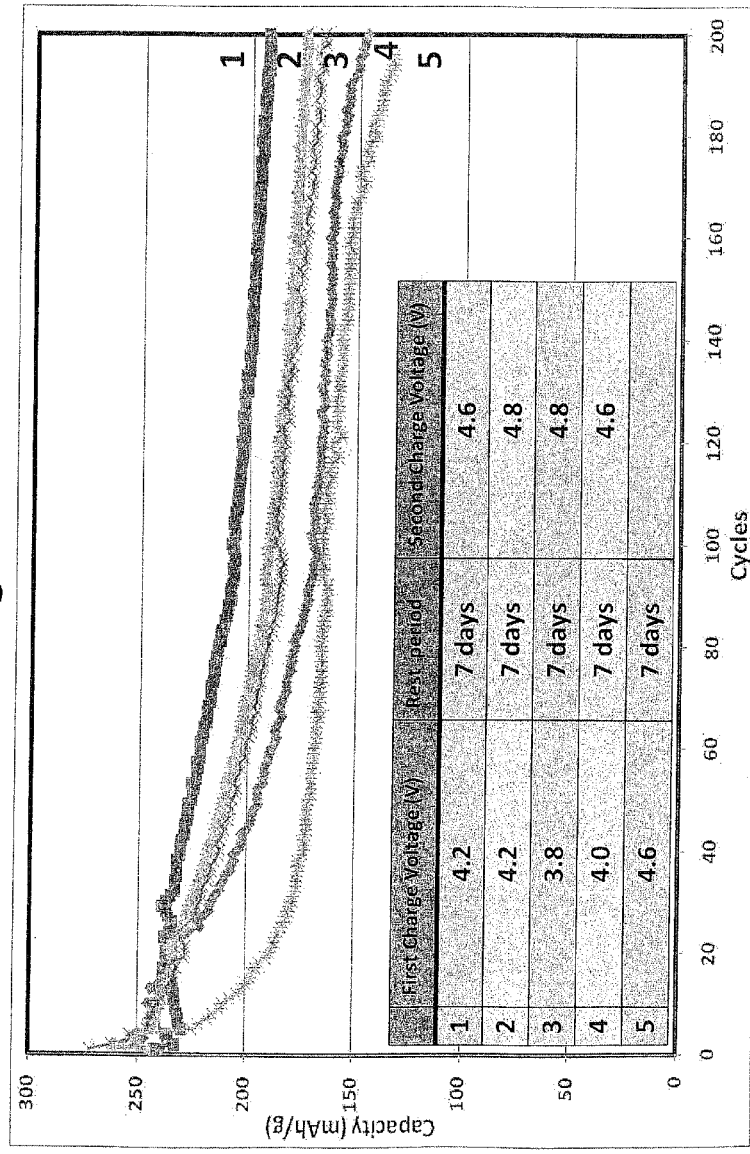
FIG. 8 is a set of plots of specific discharge capacity as a function of cycle number for batteries formed with 5 different initial and final charge voltages.

The effects of the initial charge voltage and of the final first cycle charge voltage were also examined. Referring to FIG. 8, specific capacity as a function of cycle number are plotted for 5 different formation protocols. All of these protocols involved a 7 day rest period. The lowest specific capacities were obtained with batteries initially charged to 4.6V without a rest period. Lower initial charge voltages of 3.8V and 4.0V provided some improvement in specific capacity with cycling, although the specific capacity of the batteries initially charged to 4.2V exhibited great specific capacities upon cycling relative to the cells that were initially charged to lower voltages. This may imply that a charge to about 4.2 V may be desirable for SEI formation. For the batteries initially charged to 4.2V, the full charge to 4.8V is observed to reduce the performance relative to the batteries fully charged to 4.6V.

Example 2

Effect of Cycling Voltage on Battery Capacity Fade

This example shows the effect of cycling voltage on battery capacity fade demonstrating that a deeper discharge decreases capacity fade. Three equivalent batteries were constructed as described above and foamed using formation protocol A described in example 1. Each battery was then cycled using a different cycling protocol.

For all three cycling protocols, the batteries were charged to a voltage of 4.6 volts during the charging phase of cycling. The battery cycled using the first cycling protocol was discharged to a voltage of 2.5 volts during the discharge phase of cycling. The battery cycled using the second cycling protocol was discharged to a voltage of 2.0 volts during the discharge phase of cycling. The battery cycled using the third cycling protocol was discharge to a voltage of 2.5 volts during the 115 cycles and, therefore, discharged to a voltage of 2.0 volts. Each battery was cycled more than 203 times following formation. For the first three charge/discharge cycles following formation, the batteries were charge and discharged at a rate of C/5. For the remaining 200 cycles, each battery was charged and discharged at a rate of C/3.

Figure 9:
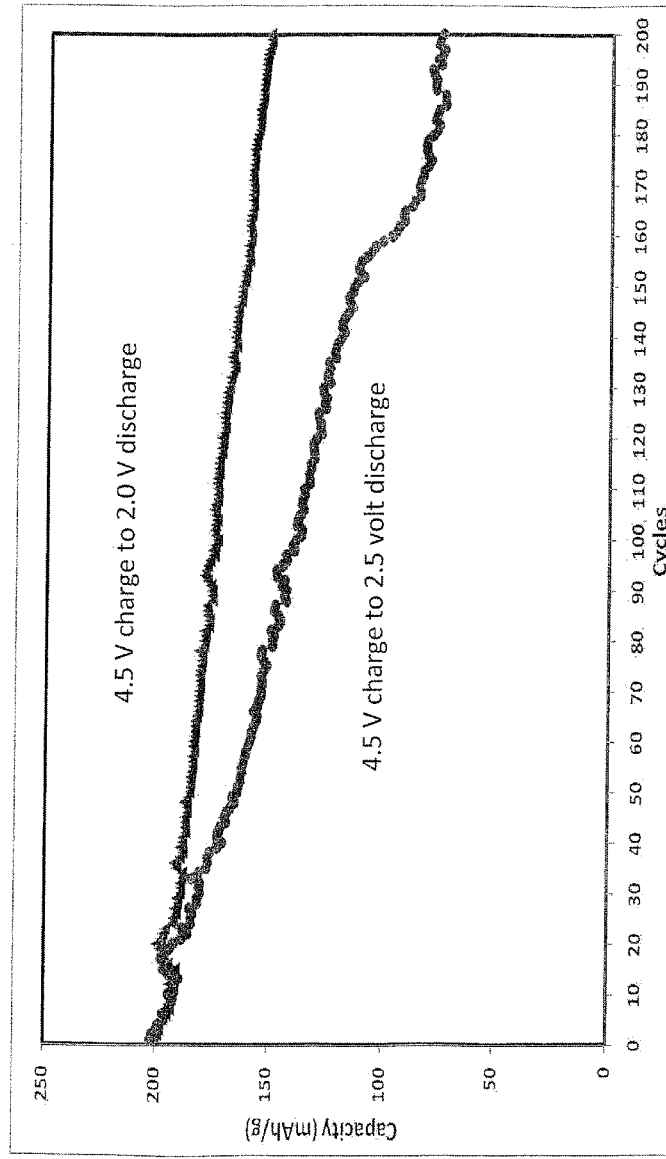
FIG. 9 is a plot of discharge specific capacity as a function of cycle number, starting from the forth actual discharge, for batteries with two different cut-off discharge voltages.
Figure 10:
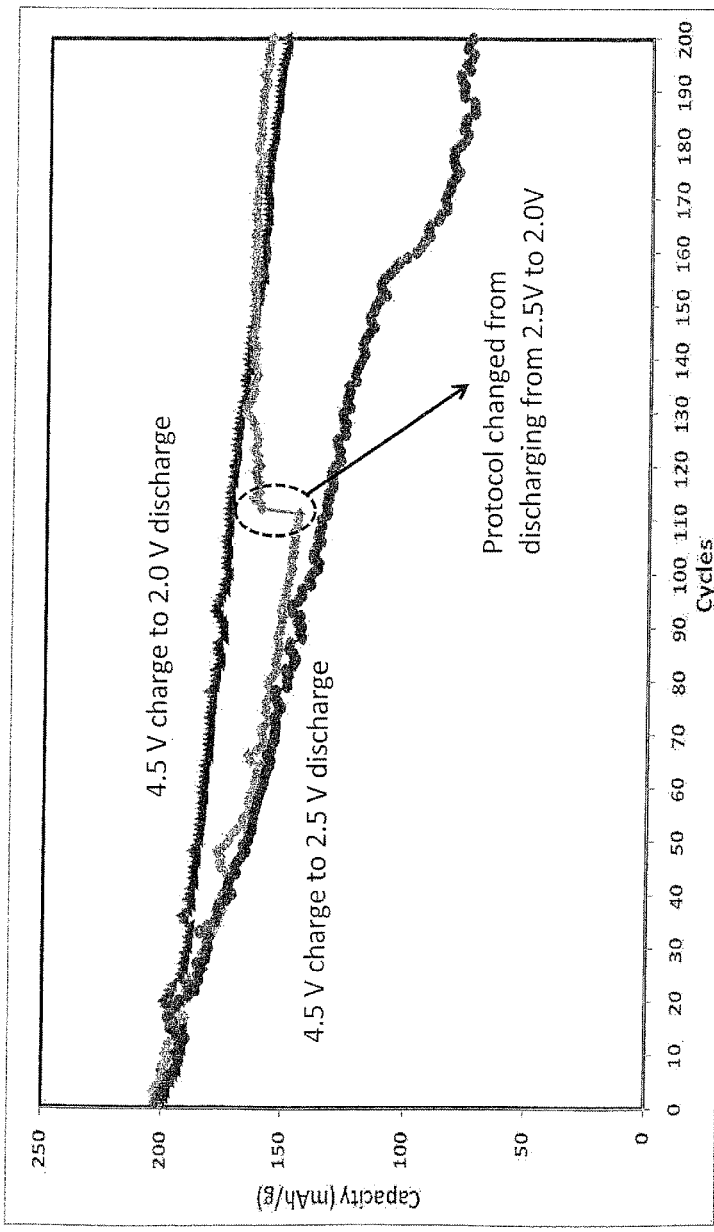
FIG. 10 is a plot of discharge specific capacity as a function of cycle number, starting from the fourth actual discharge cycle, for three batteries with two having two different cut-off discharge voltages and a third in which the cut-off discharge voltage is changed after the 110th cycle.

Referring to FIG. 9, plots of capacity as a function of cycle number are presented for the first two cycle protocols, with the first three discharge cycled truncated from the plots. As seen in FIG. 9, the battery cycled using the first cycling protocol experienced significantly greater capacity fade than the battery cycled using the second cycling protocol. At the end of 200 charge/discharge cycles, the battery cycled using the first cycling protocol experienced approximately 60 percent capacity fade while the battery cycled using the second cycling protocol experienced only approximately 25 percent capacity fade relative to the capacity at cycle 4. Surprisingly, the battery cycled using the third cycling protocol regained capacity when the discharge cut-off voltage was decreased during cycling, as shown in FIG. 10. Specifically, when the discharge cut-off voltage was 2.5 volts, the battery capacity-cycle behavior was similar to the battery cycled using the first cycling protocol. However, when the discharge cut-off voltage was changed from 2.5 volts to 2.0 volts, the battery capacity increased and the capacity-cycle behavior at longer cycle numbers was similar to the battery cycled using the second cycling protocol.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An activated lithium ion battery after a formation cycle with a charge to at least about 4.35V, the activated battery comprising:
a positive electrode comprising a lithium rich lithium metal oxide intercalation composition represented by the formula $Li_{1+x}M_yO_2$, where M refers to a mixture of metal ions, y ranges from about 0.65 to about 0.99 and x ranges from about 0.05 to about 0.25;
a negative electrode comprising a lithium intercalation/alloy composition and a solid electrolyte interface (SEI) layer associated with the lithium intercalation/alloy composition;
a separator between the positive electrode and the negative electrode; and
an electrolyte comprising lithium ions,
wherein the formation cycle to form the activated battery comprises:
performing an initial charge of the battery to a voltage of no more than about 4.3 volts;
after completing the initial charge, holding the battery at an open circuit for a rest period of at least about 12 hours; and
performing a second charge after the completion of the rest period to the voltage of at least about 4.35 volts, and
wherein after discharge, the negative electrode separated from the battery with the solid electrolyte interface (SEI) layer remaining associated with the lithium intercalation/alloy composition has an onset decomposition temperature of at least 130° C. as determined based on a differential scanning calorimetry (DSC) measurement.

2. The activated lithium ion battery of claim 1 wherein the negative electrode comprises a carbon based negative electrode active material.

3. The activated lithium ion battery of claim 1 wherein the negative electrode comprises graphitic carbon.

4. The activated lithium ion battery of claim 1 wherein the SEI layer has an onset decomposition temperature from about 135° C. to about 155° C. based on DSC measurement.

5. The activated lithium ion battery of claim 1 wherein the formation cycle comprises a charge to a voltage of at least about 4.425 volts.

6. The activated lithium ion battery of claim 1 wherein the rest period is at least about 4 days at a temperature from about 15° C. to about 75° C.

7. The activated lithium ion battery of claim 1 wherein the rest period is at least about 6 days at a temperature from about 18° C. to about 55° C.

8. The activated lithium ion battery of claim 1 wherein the initial charge is performed to a voltage of no more than about 4.25 volts.

9. The activated lithium ion battery of claim 1 wherein the second charge is performed to a voltage of at least about 4.4 volts.

10. The activated lithium ion battery of claim 1 wherein the activation further comprises discharging the battery to a voltage of no more than about 2.5 volts after the second charge.

11. The activated lithium ion battery of claim 1 wherein the initial charge is performed at a constant current and the second charge is performed at a constant voltage.

12. The activated lithium ion battery of claim 1 wherein the lithium rich lithium metal oxide intercalation composition prior to the formation cycle of the positive electrode comprises a compound represented by the formula $Li_{1+x}Ni_\alpha Mn_\beta Co_\gamma M''_\delta O_2$, where α ranges from about 0.1 to about 0.4, β ranges from about 0.4 to about 0.65, γ ranges from about 0.05 to about 0.35, and δ ranges from about 0 to about 0.1, where M'' is Mg, Zn, Al, Ga, B, Zr, Ti, Ca, Ce, Y, Nb or combinations thereof and $\alpha+\beta+\gamma+\delta=y$.

13. The activated lithium ion battery of claim 1 wherein the lithium rich lithium metal oxide intercalation composition prior to the formation cycle of the positive electrode comprises a compound represented by the formula x' $Li_2M'O_3 \cdot (1-x')LiMO_2$, where M represents one or more metal ions having an average valance of +3 and M' represents one or more metal ions having an average valance of +4.

14. The activated lithium ion battery of claim 1 wherein the electrolyte of the battery comprises ethylene carbonate solvent.

15. The activated lithium ion battery of claim 1 wherein the electrolyte of the battery comprises dimethyl carbonate.

* * * * *